United States Patent
Bouchette et al.

(10) Patent No.: US 6,458,240 B1
(45) Date of Patent: Oct. 1, 2002

(54) METHOD FOR REMOVING CONTAMINANTS FROM FIBERS IN RECYCLE FIBER PULPING

(75) Inventors: Michael P. Bouchette, Sherwood; Wayne F. Winkler, DePere; Hazen C. Thomas, Green Bay, all of WI (US)

(73) Assignee: Georgia-Pacific Corporation, Atlanta, GA (US)

( * ) Notice: Subject to any disclaimer, the term of this patent is extended or adjusted under 35 U.S.C. 154(b) by 0 days.

(21) Appl. No.: 09/754,791

(22) Filed: Jan. 4, 2001

Related U.S. Application Data
(60) Provisional application No. 60/176,424, filed on Jan. 14, 2000.

(51) Int. Cl.⁷ .............................. D21H 11/14; D21B 1/32
(52) U.S. Cl. ........................ 162/4; 162/5; 162/6; 162/7; 162/8
(58) Field of Search ................ 162/4, 5, 6, 7, 162/8

(56) References Cited

U.S. PATENT DOCUMENTS

| | | | |
|---|---|---|---|
| 4,343,679 A | 8/1982 | De Ceuster et al. | 162/4 |
| 4,381,969 A | 3/1983 | De Ceuster et al. | 162/5 |
| 4,974,781 A | 12/1990 | Placzek | 241/17 |
| 5,094,715 A | 3/1992 | Ljokkoi et al. | 162/4 |
| 5,119,994 A | 6/1992 | Placzek | 241/17 |
| 5,122,228 A | 6/1992 | Bouchette et al. | 162/4 |
| 5,262,003 A | 11/1993 | Chupka et al. | 162/4 |
| 5,302,245 A | 4/1994 | Nadeau | 162/8 |
| 5,427,650 A | 6/1995 | Holloway | 162/5 |
| 5,558,745 A | 9/1996 | Conway et al. | 162/60 |
| 5,714,040 A | 2/1998 | Poy et al. | 162/4 |
| 5,772,847 A | 6/1998 | Simpson et al. | 162/189 |
| 5,795,479 A | 8/1998 | Vogt et al. | 210/603 |
| 5,865,947 A | 2/1999 | Markham et al. | 162/5 |
| 5,895,556 A | 4/1999 | Ferguson et al. | 162/5 |
| 5,900,111 A | 5/1999 | Nystrom et al. | 162/6 |
| 5,958,179 A | 9/1999 | Gehr et al. | 162/6 |

FOREIGN PATENT DOCUMENTS

| | | | |
|---|---|---|---|
| EP | 0 486 904 A1 | 11/1991 | D21B/1/32 |
| EP | 0 657 578 A1 | 12/1994 | D21C/5/02 |
| GB | 2 067 617 A | 7/1981 | D21C/5/02 |
| WO | WO 96/36763 | 11/1996 | D21B/1/08 |

OTHER PUBLICATIONS

"The Siropulper—a new cocnept in wastepaper recovery", H. Mamers, APPITA, vol. 32, No. 2, pp. 124–128, Sep. 1978.

"Steam Explosion Technology and Fibetr Recycling", TAPPI Symposium Notes, Focus '95, Landmark Paper Recycling Symposium, Atlanta, Georgia, Mar. 19–21, 1991, Session I, pp. 321–325.

*Primary Examiner*—Dean T. Nguyen
(74) *Attorney, Agent, or Firm*—Michael W. Ferrell

(57) ABSTRACT

An improved process for the separation of cellulosic fiber from difficult to process coated and inked paper products is disclosed and claimed. This process readily separates the paper pulp fraction substantially free of contaminants from such waste paper products as single and two side polymeric coated board having wet strength resin, single and two side polymeric coated board having no wet strength resin, single and two-sided glossy printer trimmings, ultraviolet (UV) cured ink coated stocks, and mixtures thereof. Preferred embodiments include a process in an inclined pressure vessel equipped with agitating and rotating means operative to reflux the waste material with respect to the inclined axis of the vessel in the presence of steam and chemical aids for a sufficient period of time so as to bring about repulping and separation of the paper fiber fraction and formation of a contaminant-collecting polymer phase. The recovered paper pulp fraction is suitable as a feedstock in the manufacture of a variety of paper products including paper tissue and paper towel products.

115 Claims, 5 Drawing Sheets

(1 of 5 Drawing Sheet(s) Filed in Color)

METHOD FOR REMOVING CONTAMINANTS FROM FIBERS IN RECYCLE FIBER PULPING

CLAIM FOR PRIORITY

This application claims the benefit of the filing date of U.S. Provisional Patent Application Ser. No. 60/176,424, filed Jan. 14, 2000.

BACKGROUND OF THE INVENTION

1. Field of the Invention

The present invention relates generally to treating waste paper, waste paperboard or the like for use in recycle paper products. More specifically, though not exclusively, this invention relates to a process for preparing recycle paper pulp from difficult to process waste materials, such as paper stock provided with latex or other polymeric coatings, ultraviolet (UV) cured ink coated stock, and adhesive-containing paper products.

2. Background

There is a growing tendency to recycle waste paper as a source of feedstock for the manufacture of paper products. However, it is very difficult to process certain paper products such as polymer or plastic coated paper products. Examples of such products include milk cartons, ice cream containers, glossy papers, coated boards and the like. Older conventional processes are not only expensive but also may be environmentally unfriendly as they can result in additional undesirable waste products that need to be disposed of.

Relatively new technologies have attempted to address some of these problems. For example, in an article by H. Mamers entitled "The Siropulper—a new concept in wastepaper recovery" (APPITA, vol. 32, No. 2, pp. 124–128, September, 1978), the use of an explosive release digester is described for defibering purposes which may be used in connection with de-inking. The article suggests that hydrodynamic forces of the explosive discharge combine with the chemical effects of a thermal treatment process to release the ink particles from the fibers, reducing the chemical demand of the process. The pressure increase to achieve the required hydrodynamic conditions is effected by injecting pressurized inert gas into a reactor or digester. Although this method appears to have addressed several of the disadvantages of earlier recycle methods, this method still does not produce the product of desired quality, especially as to its appearance, since it produces darker product. Similarly, various other processes have been developed specifically to address environmental and economic concerns in the processing of waste paper products. One such process is generally known as the drum pulping method, which, however, is not very effective as the moisture used in this process can not effectively defiber the waste paper. In addition, the particle sizes of residual contaminants in waste paper furnish produced by this method are generally not acceptable.

Still more recently, a joint development by Wisconsin Tissue Mills and Stake Technology Ltd. was described in a paper entitled "Steam Explosion Technology and Fiber Recycling" presented at a TAPPI conference in March of 1991. The system described in that paper and related literature includes a digesting chamber where high temperature and pressure are maintained throughout the dwell time, following which the treated waste paper materials are discharged into air at atmospheric pressure and room temperature. The paper lists three runs in which the temperature range was 190° C. to 203° C., the dwell time was four minutes, and the pressure was approximately 400 psi. The process is described as resulting in particle sizes of residual contaminants of from ½ to ¹⁄₁₀ that of the contaminants in waste paper furnish produced by repulping without steam treatment. A major disadvantage of this method is that relatively high temperature and pressure conditions are needed. Explosive decompression of the drum chamber to discharge the furnish is not very desirable. Furthermore, downstream operations involve several steps to clean the pulp including removing the color bodies and other materials.

It is an object of this invention to further advance the art of recovery of wastepaper and like material and in particular to provide a process for de-inking the waste paper and to remove contaminants from the treated product.

A further object of this invention is to provide a process which not only addresses all of the above-mentioned problems but also provides a method which is economically attractive to use commercially.

A still further object of this invention is to provide a process for the recovery of difficult to process waste papers which are provided with polymeric coatings such as latex coatings or plastic coatings and UV cured ink paper products using moderate temperature and pressure conditions.

Yet still another object of this invention is to provide a process whereby difficult to process inked paper-containing and polymer-containing waste materials with polymeric coatings or components can be readily converted to recyclable pulp by separating the paper from the polymer components such that the ink and other color bodies are trapped in the polymeric waste as it separates and agglomerates from the pulped paper fraction.

The following references are of general interest: U.S. Pat. No. 4,343,679 discloses a process for reclaiming waste paper without deinking which involves pulping waste paper in the presence of soft water; U.S. Pat. No. 4,381,969 discloses a process for the generation of waste paper, which comprises pulping the waste paper with an aqueous alkaline solution; U.S. Pat. No. 5,122,228 discloses a method of treatment of wastepaper at high temperature in the range of 160° C. to about 230° C. wherein the furnish is treated in a digester with or without added chemicals but in the presence of saturated steam; U.S. Pat. No. 5,262,003 discloses a process of preparing a suspension of papermaking fibers in water for use in the making of paper, which includes the steps of treating a mass of fibrous materials with steam under pressure in two separate vessels; U.S. Pat. No. 5,302,245 discloses a process for the treatment of wastepaper, which provides for removal of both ink particles and non-ink contaminants; U.S. Pat. No. 5,714,040 discloses a method for recovering fiber from printed wastepaper by loading the wastepaper and water into a continuous batch fiber recovery apparatus; U.S. Pat. No. 5,772,847 discloses a method for processing recycling mill sludge into pulp; U.S. Pat. No. 5,795,479 discloses an apparatus and method for waste recycling and conversion in which municipal solid waste is classified as to density as well as size in a perforated inclined trommel; U.S. Pat. No. 5,895,556 discloses a wastepaper treatment process for the recycle and re-use of wastepaper, which involves treating wastepaper in a repulper with a surfactant in the absence of repulper chemicals, such as caustic, silicate, and peroxide; U.S. Pat. No. 5,900,111 discloses a process for sanitizing post-consumer wastepaper fibers for liquid packages and containers, a paper product for food packaging and a liquid food container, wherein the process involves treatment of a slurry of paper fibers from recycle with hydrogen peroxide; and U.S. Pat. No. 5,958,179 discloses a process for increasing pulp whiteness by bleaching printed wastepaper under intense dispersing mechanical treatment.

All of the references described above and hereafter are incorporated herein by reference in their entirety.

SUMMARY OF THE INVENTION

It has been found that paper pulp can be readily separated from difficult to process waste materials utilizing an improved waste treatment process. This process produces high quality paper pulp, which is substantially free of polymeric and color body contaminants. Significantly, the process of the present invention involves considerably fewer steps than conventional processes and advantageously generates less downstream waste.

Thus, in accordance with the practice of this invention there is provided a process for recycling waste materials including waste paper and polymeric waste material comprising the following steps: a) in a first step, the waste materials along with suitable amounts of water are introduced into a pressure vessel wherein the pressure vessel is equipped with agitating means providing shear to thoroughly mix the components of the solid wastes; b) a suitable chemical aid is also introduced into the pressure vessel either during, after or before introduction of the waste materials into the pressure vessel, generally, it is advantageous to introduce the chemical aid in the form of a solution in water soon after the waste material is introduced into the reactor inasmuch as the chemical aid facilitates defibering of the paper fraction of the waste materials; c) the waste materials are then agitated in the vessel by way of the agitating means under shear at an elevated temperature and pressure for a sufficient time to accomplish repulping of the moisture absorptive paper fraction, wherein the pressure vessel is rotated and agitation is carried out in such a way that the separation of component fractions by density and size can thereafter be accomplished; and d) in the final step of a process of this invention, the separated waste materials are discharged from the pressure vessel. The pulped paper fraction is usually, through not necessarily, discharged first, and is substantially defibered and substantially free of polymeric contaminants. The polymeric material is agglomerated and is operative to concentrate other contaminants such as color bodies from the materials.

In another aspect of this invention there is provided a process for recovering a paper pulp fraction from paper-containing and polymer-containing waste materials utilizing a preferred mixing vessel. This mixing vessel is of generally cylindrical configuration mounted to be driven in an inclined rotation about its longitudinal axis. There is provided an array of fixed lifting paddles adapted to agitate the paper-containing and plastic-containing waste materials, as well as a helically configured member. Utilizing this mixing vessel, the process of a preferred embodiment comprises the following steps: the paper-containing and polymeric waste material and water are introduced into the vessel through an inlet thereof; either concurrently or after the introduction of waste materials, suitable amounts of chemical aids are also introduced. The vessel is rotated about its longitudinal axis, so as to agitate the waste material. The vessel is also provided with steam to provide thermal energy to the waste material and to raise the pressure inside the vessel to a level above atmospheric pressure. While the temperature and pressure of the vessel are increased, the rotation of the vessel is continued to accomplish repulping of the moisture absorptive paper fraction.

In accordance with still yet another aspect of the present invention, a specific pressure vessel is of generally cylindrical configuration, having rotatably mounted in its interior, a drum of generally cylindrical configuration that is mounted to be driven about its longitudinal axis. The pressure vessel further consists of an inlet end and a closure member therefor. The drum further has an open inlet adjacent to the inlet of the vessel. The interior of the drum being equipped with at least one helically configured baffle and lifting paddles adapted to agitate the paper-containing and polymer-containing waste materials. Utilizing the pressure vessel in this preferred embodiment, the process comprises the following steps: the waste material and water are introduced through the inlet of the vessel into the inlet of the drum; suitable amounts of chemical aids are introduced in order to facilitate deliberation of the paper fraction of the waste material; the closure member is then closed thereby making the vessel pressure tight; the rotation of the drum about its longitudinal axis is commenced, so as to bring about agitation of the waste material in the drum; the drum is then pressurized with steam to elevate the temperature of the waste material in order to facilitate the sterilization of the waste materials in the drum, and to raise the pressure inside the vessel to a level above atmospheric pressure; the rotation of the drum is continued with added thermal energy to accomplish repulping of the moisture absorptive paper fraction; and finally, the treated waste materials are discharged from the drum and the vessel.

In yet another aspect of this invention there is provided a process for preparing a recycle fiber-containing paper product from paper-containing and polymeric waste materials. In this preferred embodiment, the paper pulp formed in accordance with the practice of this invention is further processed in the production of a recycled sheet of paper, tissue or paperboard, and like products.

The feedstock including wastepaper and polymeric waste utilized in accordance with the invention may include coated feedstock provided with latex coatings, fillers and the like. The coatings or polymeric components may include synthetic polymers such as acrylates and vinyl acetates or natural polymers and pastes of starch or organic pastes, as well as natural and synthetic adhesives. The polymeric material may be in the form of a coating, binder or simply be associated with the paper fiber component as in the case of packaging with a paperboard component and plastic film component. The characteristic feature of the feedstock utilized in accordance with the present invention is that the feedstock includes both cellulosic fiber-containing paper and a resinous polymeric component which is agglomerated during the process and operative to segregate other contaminants from the liberated papermaking fiber. As used herein, the term "polymeric" includes waxes, as well as high polymers.

In a particularly preferred process, a paper stock with a polymeric coating is introduced into an inclined rotatable drum provided with a plurality of mixing paddles affixed to the interior surface of the drum together with water and an alkaline agent. The drum is thereafter rotated while maintaining the drum interior at elevated temperature and pressure. The mixing paddles are configured to move the material upwardly with respect to the inclination of the drum thereby mechanically refluxing the material against its natural tendency to flow downwardly with gravity during rotation of the drum. The material is thus well mixed and the polymeric material tends to agglomerate or granulate and concentrate other contaminants within the polymeric phase, while the paper fraction of the waste is substantially defibered into recycle pulp. There is thus provided a recycle pulp phase and a polymeric phase which can be discharged from the drum and readily separated.

These and other objects, features and advantages will become more apparent from the description provided below.

BRIEF DESCRIPTION OF DRAWINGS

The file of this patent contains at least one drawing executed in color. Copies of this patent with color drawings(s) will be provided the Patent and Trademark Office upon request and payment of the necessary fee.

The invention is described in detail below in connection with numerous embodiments and figures. In the Figures.

DETAILED DESCRIPTION OF THE INVENTION

Figure 1:
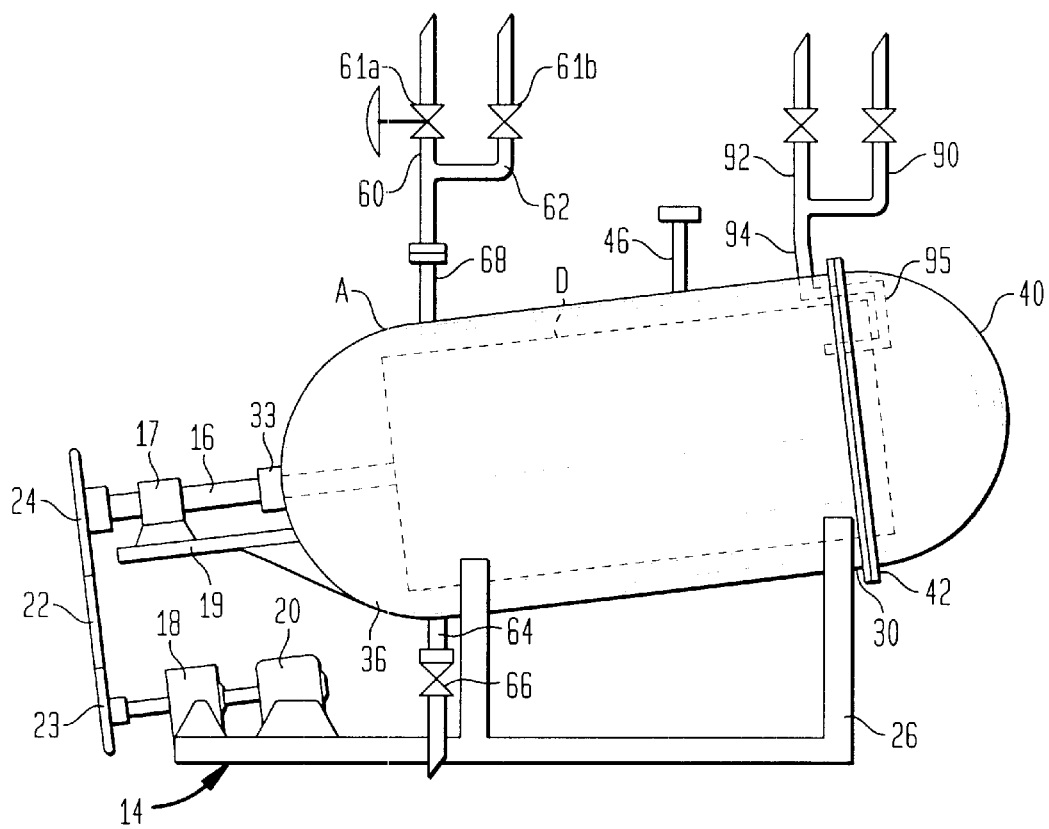
FIG. 1 is a side elevational view of a pressure vessel used in one of the preferred embodiments of this invention for processing difficult to process paper-containing and polymeric waste materials, such vessel having a rotating drum.
Figure 2:
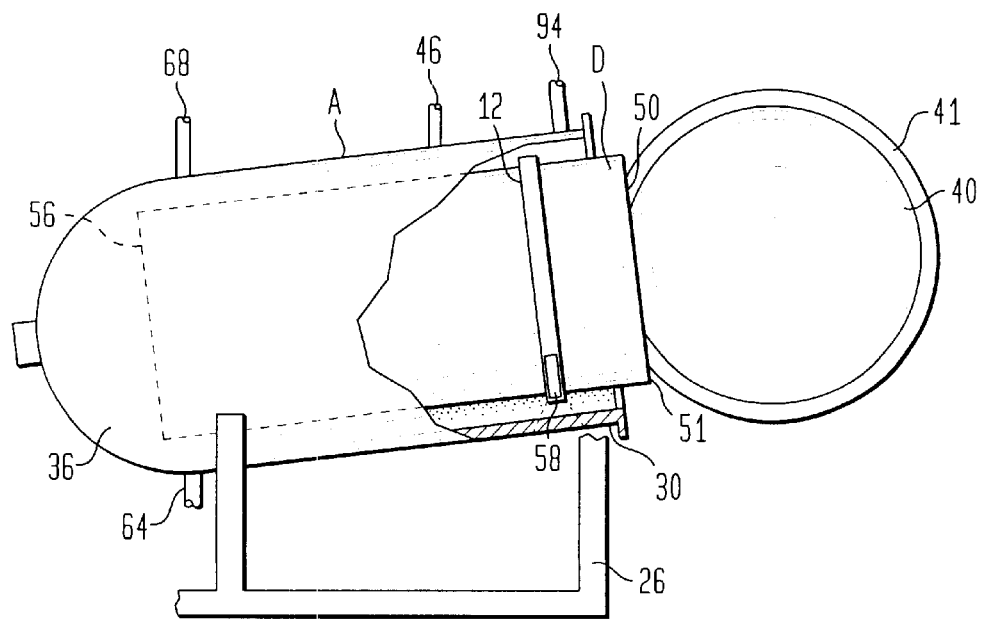
FIG. 2 is a view of the vessel of FIG. 1, in partial section, showing the rotating drum, and showing the vessel's closure panel in the open position.

The present invention is described in detail in connection with various embodiments for purposes of illustration only. Such description is not limitative of the invention which is defined in the claims appended hereto. Various terms as used herein are likewise defined in the description which follows. Concentrations in percent are in weight percent unless the context indicates otherwise.

As used herein, the terminology "polymeric", "plastic", "polymer" and like terms means and includes all organic, synthetic, natural or processed natural polymeric materials such as cellulose acetate, including resins, adhesives, foams, films, sheets and alloys (composites) that are molded, cast, extruded, drawn or laminated or otherwise applied onto or into objects or films. Such application may be carried out using any of the water or oil based latices and by any of the known techniques in the art. Examples of coating techniques include blade coating, dip coating, spray coating, and the like. Specific examples of polymeric materials include addition polymers such as vinyl polymers, including acrylates and vinyl acetate, latexes thereof, polyolefins, condensation polymers such as, polyesters or polycarbonates, and the like.

A non-exhaustive list of advantageous features of the present invention includes:

1. The plastic containing difficult-to-process waste materials when subjected to process of the present invention results in full separation of polymer components from the pulped paper fractions. Further, the separated polymer coatings tend to ball up into balls of several centimeters in diameter and larger making it easy to separate the pulped paper fraction from the polymeric fraction.
2. The pulp fraction tends to be off-white to colorless and some of the brown color resulting from the pressure vessel is taken up by the liquor rather than the pulp, thus minimizing the downstream cleaning operations.
3. The inks from the wastepaper tends to stay with the separated plastic material, leaving behind a cleaner/whiter furnish than is generally expected.
4. When UV coated waste materials are utilized, the UV coated material breaks UP well in the pressure vessel, avoiding subsequent fiber cleaning steps and clearly showing that the contaminants have been removed from the pulped paper fraction.
5. When a mixture of waste materials are used, as further discussed in detail hereinbelow, the process of the present invention offers unique advantage in that the separated plastic material serves to collect the ink and dirt contaminants. In other words, the plastic operates as a concentrator of contaminants including dirt and color bodies from the waste materials.
6. Because of the fact that separated plastic fraction acts as a trap to collect dirt and/or color bodies, the downstream cleaning of the paper pulp fraction is significantly reduced thus offering considerable processing advantages.

Various types of wastes that are containing paper and plastic materials may be used to recover the paper pulp in accordance with the process of the present invention. Interestingly, it is now found that difficult-to-handle and difficult-to-process waste materials can readily be processed in the present invention to produce high quality paper pulp. Examples of such difficult-to-process waste materials include single and two side plastic coated board having wet strength resin, single and two side plastic coated board having no wet strength resin, two-sided glossy printer trimmings, ultraviolet (UV) cured ink coated stocks, and mixtures thereof. Further examples of plastic coated boards include two side coated (C2S) plastic food board having wet strength resin, such as milk carton or other cartons used for dry food storage and the like. Further examples of plastic coated boards having no wet strength resin include ice cream containers, various other frozen food packages and the like. Still further examples include two-sided glossy photo trimmings, ice cream tops, unprinted colored paper, newspaper and the like. Any of these waste materials either alone or in any combination of mixtures may be used in this process as the raw materials.

Another aspect of this invention is the surprising ability of deinking of the waste materials. Thus various difficult-tohandle inked waste materials especially the UV cured inked waste materials can be used in the process of this invention. Examples of such wastes include any of the UV printed/ cured wastepaper.

The deinking of waste papers is an art unto itself. The processing equipment required is a function of the type of wastepaper to be treated. However, because of the capital costs of such equipment, the industry generally tries to select a good general system, the components or entirety of which have been already proven in the field. Or, one attempts to add such equipment to an existing process. What happens in many cases is that the limits of such processes are quickly discovered, and there remains an inevitable waste stream which is available, but cannot be processed or deinked satisfactorily. These difficult to process wastepapers are then burned or landfilled, which not only wastes the fiber value, but also adds to environmental pollution. It is, therefore, very desirable to discover a low capital cost equipment/ process which can satisfactorily process and utilize these difficult to process wastepapers.

The invention combines the advantages of such an equipment/process system with the selection of certain very difficult to process wastepapers and renders the wastepapers into a deinked and defibered condition wherein the fibers can be used and have value, and in which the necessary cleaning steps successive to the repulping operation are less than would be expected. In this manner, previously unuseable wastepapers become useable and have value, while at the same time removing them from landfill and/or other environmental pollution streams associated with their otherwise methods of disposal.

For example, a C2S sized poly coated wastepaper was processed in two different state-of-the-art deinking/ repulping operations in a 100% secondary fiber mill operation. In the first case, wastepaper was processed in a medium consistency pulper using a vertical auger. Caustic and bleach were added to facilitate repulping. After a 40 minute repulping time, which was already longer than is used in the commercial operation, the C2S boardstock had not repulped. The clear majority of the paper was still in the same form and size as it was when it was charged into the pulper. The discharge from this paper had to be landfilled, as it was unuseable. In the second case the same furnish was added to a drum pulper (non-pressurized). Again, after a 40 minute (longer than normal) dwell time in the pulper, the discharged material was essentially in the same form and size as it was when it was charged into the pulper. Again, the discharge had to be landfilled. Both of these processes are state-of-the-art in a 100% secondary fiber describing mill, and the results demonstrate that the mill is unable to process a wastepaper such as the C2S sized poly coated boardstock.

The equipment and process of this invention, using a pressurized rotary drum pulper at elevated temperature was able to process this C2S sized poly coated boardstock, rendering it valuable and useful, while also removing it from the landfill/environmental pollution stream otherwise utilized for its disposal. Specific examples follow a general discussion of a preferred apparatus.

Pressure Vessel

Any suitable pressure vessels that can bring about the needed effects in processing the waste materials of this invention may be employed in connection with this invention. However, the pressure vessel should advantageously be equipped with suitable agitating means in order to facilitate proper agitation of the waste materials under the conditions in accordance with the process of the present invention. A preferred pressure vessel in accordance with this invention is a pressure vessel of generally cylindrical configuration mounted to be driven in inclined rotation about its longitudinal axis as disclosed in U.S. Pat. Nos. 5,119,994 and 4,974,781, the disclosures of which are incorporated herein by reference. The pressure vessel is equipped with suitable means for agitation to effect uniform mixing of the waste materials and breaking up of the plastic-containing and paper-containing waste materials. Examples of suitable agitating means include mechanical, hydromechanical or electrical devices. Specific examples of mechanical devices include mechanical stirrers, shakers, blenders, tumblers, and the like. It has been found that an array of fixed lifting paddles mounted in an interior section of a pressure vessel and a helically configured member also mounted in the interior of the vessel cooperate as preferred agitating means for the process of this invention. Preferably, the agitating means is provided within a drum, which is rotatably mounted at an incline inside a pressure vessel.

Thus, a preferred apparatus in accordance with this invention involves the generally cylindrical vessel mounted at a slight angle of incline with respect to the horizontal plane, with the preferred angle of incline being about 7°, the upper end of the vessel having an opening to receive materials and the lower end of the vessel being closed. The vessel is designed with a highly effective closure device on the opening that, when closed, seals the vessel from the atmosphere to allow a buildup of pressure to occur within the vessel during its operation, or, alternatively, permits a vacuum to be maintained within the vessel by the functioning of an appropriate vacuum system.

As the drum is rotated in accordance with a process of this invention, the materials in the drum are believed to be tumbled in contact with the sidewall of the drum, a distance equal to the angle of repose of the materials times the coefficient of friction of the materials times the rate of rotation of the drum. The angle of repose of the treated material is approximately 45° and the coefficient of friction is approximately 0.2.

The processing of the paper-containing and plastic-containing waste material is accomplished with the addition of heat sufficient to repulp and incidentally to sterilize the waste materials. The waste material that is being processed is held at a temperature of at least about 100° C. for a period of at least about 90 minutes, at a pressure of approximately 15 psig, or at a temperature of about 140° for a period of at least 40 minutes, at a pressure of approximately 50 psig, or other combinations of pressure, temperature and time as have been shown to accomplish complete and effective repulping of contaminated waste. Preferably a sufficient amount of steam is introduced into vessel during drum rotation while the waste materials are being agitated so as to bring about an internal temperature of about 110° C. and a pressure about 18 psig to reduce the time required to accomplish pulping, which time is about 40 to 60 minutes, preferably 60 minutes. More preferably the internal temperature is about 135° C. at a pressure of about 45 psig, the time to accomplish pulping being about 40 to 80 minutes, more preferably 60 minutes.

By virtue of the added moisture, which increases the conduction of heat into the materials being processed, materials that might otherwise produce an insulating effect for themselves and on other materials are completely and quickly penetrated by the required repulping heat, thus avoiding the creation of pockets in which infectious materials could be protected from sufficient heat to accomplish complete repulping.

Because of the reduction in size of the pulpable fractions of the wastes as they are processed, as previously described, and because the heat of the process causes the plastic fractions of the wastes to become heat distorted and to collapse into more compact forms, the entire amount of the waste is more completely agitated and therefore most completely contacted by the heat.

After the waste materials have been processed for a sufficient amount of time at a sufficiently high temperature, a vacuum is induced on the processor to extract excess moisture from the processed materials, thereby producing a material that does not drain water from it in subsequent handling and that is less in weight as a result of the wet processing than it would be if left without dewatering as it is disposed of. The extracted water can be recovered and held for reuse in processing additional waste materials.

Instead of using a vacuum system to accomplish dewatering of the processed waste materials, a mechanical dewatering system such as a dewatering press of the type that is commercially available could be employed.

Chemical Aids

It has been found that addition of suitable chemical aids during agitation process significantly improves the quality of the pulped paper fraction. First, it has been found that the extent of defibering is increased in the presence of chemical aids. Second, the pulp formed in the presence of certain chemical aids is almost white and can be directly used in the recycling operation without any additional process steps. Third and most important advantage observed is contaminants of the pulp are significantly reduced thus eliminating the need for any downstream cleaning steps.

Thus in accordance with the process of this invention there is included at least one chemical aid selected from the group consisting of alkaline agent, buffer, bleaching agent, detergents, surfactants, solvents, dispersants, chelating agents, sequestrants, and mixtures thereof. These chemical aids either alone or in combination thereof may be used in their bulk form or in solution, preferably as solutions in water. Any amount of these chemical aids may be used to bring about the intended benefit, however, the preferred chemical aids and amounts are described in more detail below.

1. Alkaline Agent

Any alkaline agent now known or hereinafter developed for use with cellulosic material which produces alkaline pH in water may be used in this invention. Examples of such alkaline agents are lithium hydroxide, sodium hydroxide, potassium hydroxide and other alkali metal or alkaline earth element hydroxides. Sodium hydroxide is especially preferred. The total concentration of alkaline compounds in the solution used is in general selected to be greater than 0.5% of the total weight of the feed including the waste material and water. Most commonly, it is chosen to be greater than 0.8% of the total weight of the feed. In general, this concentration is kept at less than 5%. The best results have been obtained with concentrations of between 1% and 2.5%, and sometimes 3%. Up to 5% and perhaps 10% is feasible.

2. Buffer

Any buffer material now known or hereinafter developed, which is useful for controlling the pH of the medium in the pH range of 8–10 may be used as a buffer in accordance with the process of this invention. An example of such a buffer is sodium silicate, which acts as a buffer within this pH range.

3. Bleaching Agent

Bleaching agents also are added to the waste materials to obtain pulped paper fraction having acceptable brightness values. Any bleaching agent now known or hereinafter developed for bleaching cellulosic material likely can be used to practice the present invention. The amount of bleaching agent used should be from about 0.5 to about 1.3 weight percent. Working embodiments of the invention have used about 1 weight percent hydrogen peroxide as the bleaching agent for processing pulp mixtures containing the paper-containing and plastic containing waste materials. Sodium hypochlorite may also act as a suitable bleaching agent as well as a biocide.

Various other chemical aids such as detergents, surfactants, solvents, dispersants, chelating agents, sequestrants either alone or in combination thereof may be used in the process of this invention. All of these chemical aides now known or hereinafter developed for such purpose may be used in quantities sufficient to bring about the intended benefit. However, these chemical aides are used only if the pulp formed therefrom exhibits acceptable qualities.

The preferred chemical aids are sodium hydroxide alone or in combination with hydrogen peroxide as described in more detail in the working embodiments of this invention.

After rotation at elevated temperature and pressure, the materials are discharged from the rotating vessel for the recovery of the repulped materials for recycling. Typically the discharged pulp fraction contains solid concentration of about 15 weight percent to about 50 weight percent based on the total wet weight of the discharged pulp fraction. Preferably the solid concentration is in the range of about 25 weight percent to about 40 weight percent based on the total wet weight of the discharged pulp fraction.

Further, as stated hereinabove, the pulp fraction is essentially defibered. Preferably, the pulp is at least about 80 percent defibered, more preferably, the pulp is at least about 90 percent defibered. Also, as stated earlier, the pulped paper fraction is substantially free of plastic contaminants. Preferably, the pulp contains less than 10 weight percent, more preferably one weight percent of the plastic contaminants based on the total weight of the pulp.

In one of the preferred embodiments of the process of this invention, the pulped paper fraction is further subjected to a subsequent processing step to produce a paper product. Most preferably the paper product is either a paper tissue or a paper towel product.

The waste material may include UV printed/cured paper. The pulp formed from such a waste material is substantially free of ink. Surprisingly, it has now been found that most of the ink so removed from the paper fraction is trapped in the plastic. Thus, plastic fraction operates as a concentrator of all of the ink and substantially reduces downstream cleaning of the pulp.

Referring to FIGS. 1–9, there is shown a preferred apparatus for practicing the process of the present invention as disclosed in U.S. Pat. No. 5,119,994. The apparatus includes a heavy walled processing vessel A that is generally cylindrical in configuration. Heavy walls are used in the construction of vessel A in order that it can operate under conditions of high internal pressure as well as on occasion, under vacuum conditions as noted above. The vessel A is mounted in a non-rotatable manner on a sturdy stationary support 26, having a sufficiently wide base as to give ample stability. The support 26 preferably utilizes structural steel members designed to effectively transfer the weight of the processor and its contained materials to the foundation under the processor.

The rotating drum about to be described, that is utilized within the shell of the vessel A, transfers its forces to carrier and support bearings, which in turn transfer that load into the shell of the vessel A and become a part of the load supported by the structural supports of the shell, and thus transferred to the foundation below the processor.

A closure device or dome shaped door 40, provided with a seal 41, is hingedly mounted adjacent the inlet 30 of the vessel A so that substantial pressure or a vacuum can be established inside the vessel at selected times, as mentioned previously.

Located inside the non-rotating vessel A is a generally cylindrical drum D mounted so as to be rotatable in either direction on its axis, which axis is coincident with the axis of the vessel A. Drum D is provided with a riding ring or support ring 12 adjacent its front end 50, with rollers or trunnion bearings 58 being positioned on the interior of vessel A to contact the ring 12, and thus provide support for the front end 50 of the drum D. The front end 50 of the drum D is open, whereas the rear or lower end 56 of the drum is closed and watertight.

Affixed to the rear or lower end 56 of the drum D is drive shaft 16, which is arranged to support the rear end of the drum D and drive it in rotation. The shaft is rotatably supported by roller or ball bearings 17 that are in turn supported from a structural member 19 attached to the vessel A. This support arrangement is designed to fix the location of the drum D insofar as its horizontal positioning within the vessel A is concerned.

The drive shaft 16 of the drum D penetrates the shell of the vessel A and is sealed from the atmosphere by a seal 33 to enable a selected pressure or a selected vacuum to be maintained from time to time within the vessel A, and of course within the drum D.

The typical rate of rotation for the drum D is between 2 and 30 rpm and preferably approximately 8–15 rpm to facilitate a uniform loading of forces on the drive mechanism 14 utilized for driving the drum in rotation.

Figure 3:
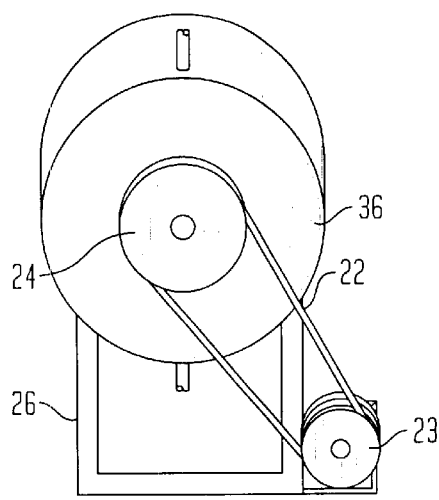
FIG. 3 is an end view in elevation of the pressure vessel of FIG. 1; this view showing the drive belt and motor used for driving the drum in rotation.
Figure 4:
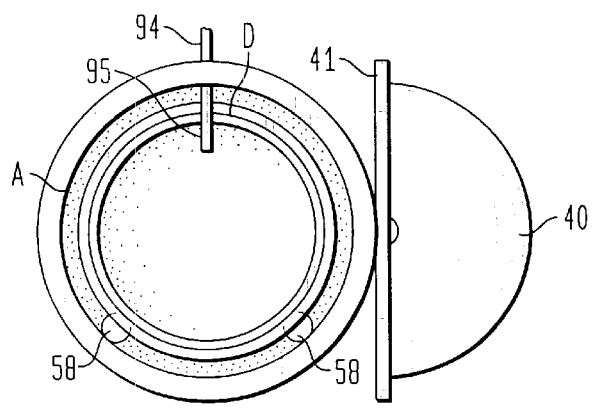
FIG. 4 is an end view of the vessel of FIG. 1, illustrating operation of the closure panel.

The drum D is capable of being rotated in either direction on its horizontal axis by means of the drive assembly 14 depicted in FIG. 1 that may, for example, utilize a reversible electric motor 20 and suitable reduction gearing 18 connected to the drive shaft 16 of the drum to turn the drum D in the selected direction. It is preferable to use a heavy duty chain 22 passing over sprockets 23 and 24 for transferring the rotation of the motor to the drive shaft, in an arrangement familiar to those knowledgeable in the art, as depicted in FIGS. 1 and 3.

By placing the drum D within the pressure vessel A, it is possible to have the same advantages of unobstructed agitation of materials as it would have had in a free-standing rotatable drum. By designing the drum to have adequate containing walls, the materials that are being processed and the additives to be inserted into those materials are contained within the drum during processing. Because in accordance with this invention the drum is disposed within a pressure vessel, the materials of construction of the drum are considerably lighter than are required for a free-standing, rotatable drum, which would have required the structural integrity to withstand the forces of pressure as well as the forces associated with the vacuum that will be utilized from time to time in the process.

As discussed previously, the interior of drum D is equipped with a series of lifting paddles 70 and a helical flighting 80 to facilitate agitation and movement of waste materials as a consequence of rotation of the drum D. The lifting paddles used for the instant invention and the flighting will shortly be described in more detail.

Vessel A, in accordance with this invention, is preferably operated on an incline. The preferred angle of incline is 7° from the horizontal, with the front or inlet end 30 being higher than the closed lower end 36 of the vessel. The angle of incline aids in containing the materials to be processed within the drum D in that the waste materials will be moved through the drum D toward the back end, at least partly under the influence of gravity as the drum is rotated.

Although there is no limitation for the size of drum D, but it is to be noted that a device utilizing a drum approximately ten feet long is of a size that can be effectively utilized in a recycling station. In other words, a smaller sized version of a waste processor in accordance with this invention could take the form of a unit that could be placed within a relatively limited area, to handle smaller scale any special type waste materials generated therein.

At the same time, it is obviously possible to use larger units to perform large scale operations, and by the foregoing mention of a processor of a size to be used in a disposal facility is not intended to limit the largeness or smallness of any processor, except that the diameter of the vessel should be sufficiently large as to accept materials upon which a prior size reduction has not taken place. Any combination of reasonable diameters and lengths could be utilized in accordance with this invention, limited only by practicality.

Returning to the details of a preferred embodiment of this invention, the lifting paddles 70 are mounted on the interior of the drum D and are arranged so as to minimize any obstruction of flow of materials within the drum. The lifting paddles are distributed in sections along the horizontal dimension of the drum, as shown in FIG. 5, and are staggered at approximately 45° intervals from one section to the next.

Figure 5:
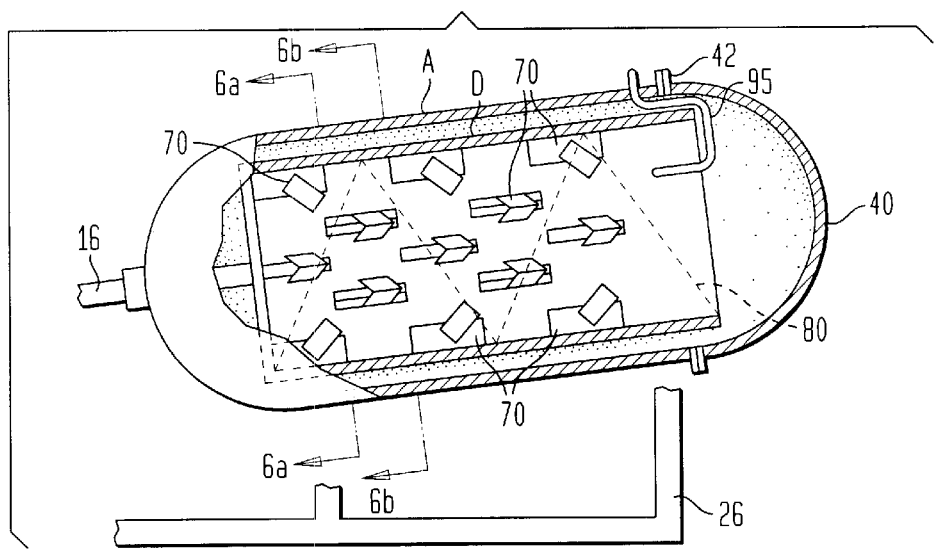
FIG. 5 is a side elevational view of the apparatus of FIG. 1, in partial section, showing lifting paddles disposed in a spaced array around the interior of the rotating drum, with the location of a helical baffle being indicated is by the use of dashed lines.
Figure 6A:
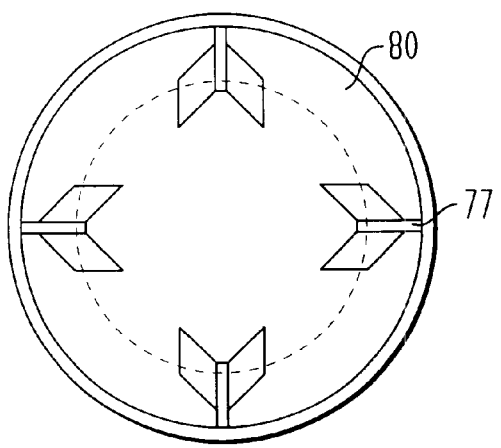
FIG. 6a is a cross sectional view taken along lines 6a—6a of FIG. 5.
Figure 6B:
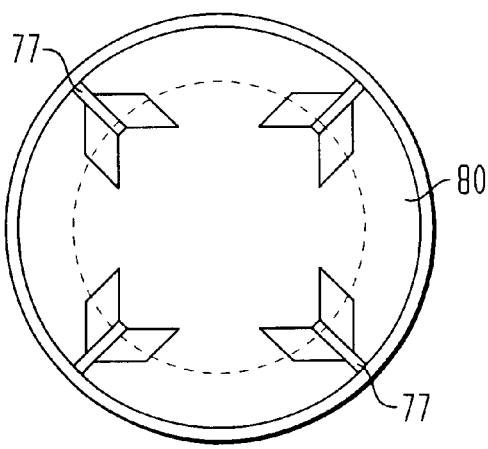
FIG. 6b is a cross sectional view taken along lines 6b—6b of FIG. 5.
Figure 7:
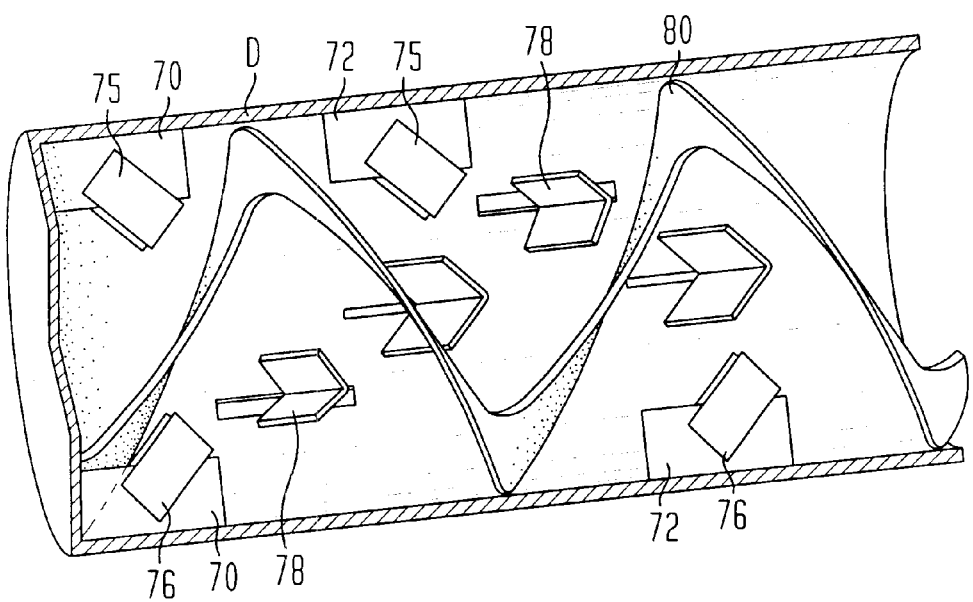
FIG. 7 indicates the relationship of the lifting paddles to the helical baffle disposed around the interior surface of the rotating drum of FIGS. 1–6b.

The lifting paddles 70 are affixed to the interior perimeter of the drum D perpendicular to the shell of the drum, as shown in FIGS. 6a and 6b, and are oriented lengthwise to correspond with the longitudinal dimension of the drum, as is shown in FIGS. 5 and 7.

Figure 8:
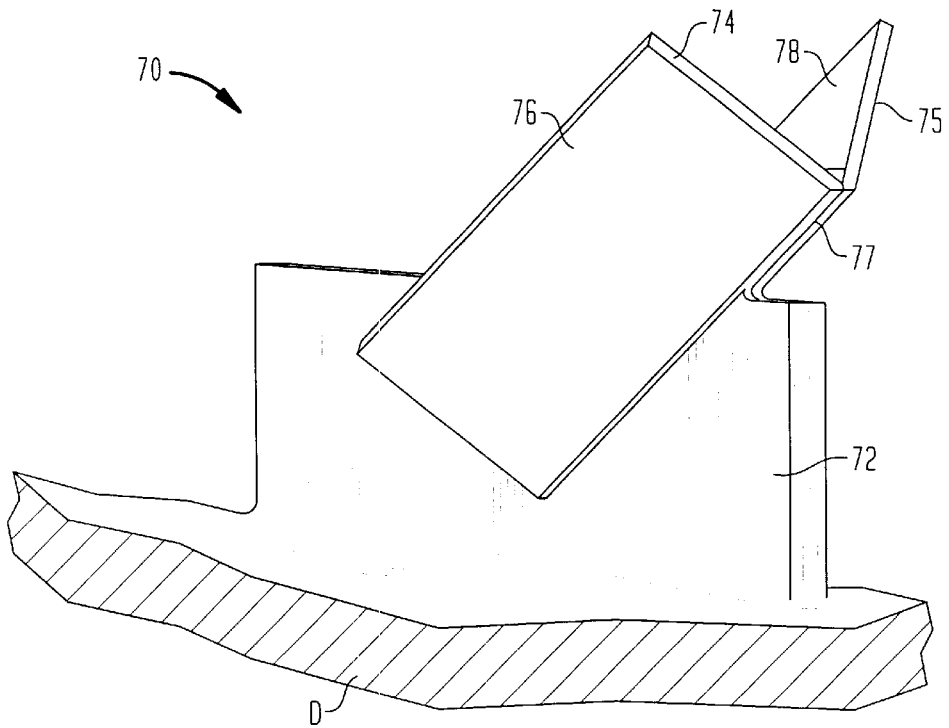
FIG. 8 is an enlarged scale drawing of a typical lifting paddle utilized in connection with this invention, also showing an adjacent portion of the drum in cross section, the closure panel end of the drum being toward the left as viewed in this figure.

As best seen in FIG. 8, the perpendicular leg 72 is affixed to the interior sidewall of the drum, and the angled member 74 is affixed at its midline 77 to the radially inner portion of the perpendicular leg. The angled member 74 has external surfaces 75 and 76, with surface 75 being at an angle of approximately 45° from the perpendicular leg 72 of the lifting paddle, and surface 76 being at a like angle to the leg 72. It is preferable to utilize the midline 77 of the angled member 74 at an angle of approximately 52° with respect to the interior surface of the drum D, and as shown in FIG. 8, the midline 77 is placed in a direction that is toward the higher end of the drum D. Stated somewhat differently, the interior portions 78 of the lifting paddles face the closed end 56 of the drum D, which is to the left as view from the perspective of FIG. 8.

In a preferred embodiment, the angle of incline of the drum is about 7° with respect to the horizontal, so the angle of incline of the angular portions 75 and 76 of the lifting paddle is 52° with respect to the shell wall of the drum D, and this results in the angular portions 75 and 76 of the lifting paddle operating at an angle of 45° with respect to the horizontal.

The helical flighting or baffle 80 is affixed to the interior perimeter of the drum D so as to minimize obstruction of flow of materials within the drum, and preferably at a frequency corresponding to one complete cycle of the helix in a distance equal to the diameter of the drum, measured along the length of the drum. The angularity of the helical flighting is such that when the drum D is rotated in what is called the first rotative direction, as discussed previously, the materials to be processed are moved forward, toward the closed lower end 56 of the drum, whereas rotation of the drum in the second rotative direction causes the materials to be moved backward toward the inlet opening 50 of the drum.

The helical flighting is continuous, meaning that occasional lifting paddles 70 must be eliminated at certain locations in order to make fabrication possible.

As is obvious to those skilled in the art, the size and frequency of the lifting paddles, the angle of incline of the drum and the rate of rotation of the drum are variable and are a function of the required rate of movement of materials within the drum and the amount of material to be processed in a given amount of time.

The diameter of the drum needs to be sufficient to accept a selected quantity of material to be processed, with an additional space of approximately 40 percent of the volume of the interior diameter of the drum needed to remain vacant to allow materials to fall and to mix within the drum as it rotates. In a design of this type of device, additional processing capacity is added to the processor by increasing its length. The ratio of diameter to length is variable and depends upon the amount of material to be processed in a given amount of time in concert with the size and frequency of the agitation mechanisms of the drum to insure complete mixing of materials.

Devices for monitoring and controlling the process include such as water piping, steam piping, vacuum piping, pressure controllers and other needed instruments. In using a free-standing, rotatable drum, each of these devices requires that they be affixed to the centerline of the axis of rotation of the rotatable drum, which complicates the closure devices on such a vessel and, by necessity, places these devices at the ends of the drum. In the case of pressure controllers, vacuum connections and temperature controlling instruments, this is not an appropriate location. Rather, devices of this type should monitor and control the process from a location that is nearer to the point in the process where the reaction is taking place, and not adjacent to or at the opposite end of the injection of additives to the process. These factors have contributed to the decision to utilize a pressure vessel in which a rotating drum is utilized.

Another reason for the decision involves the fact that the requirement for pressure and vacuum to be induced in a system further complicates the utilization of a free-standing, rotating drum. Vacuum, in particular, requires that the selected device have considerable strength to keep from collapsing, and this generally equates to massive components, requiring considerable horsepower if such components are to be driven in rotation.

Additionally, the requirement to introduce large objects that are generally not free-flowing, that are not conveniently reduced in size prior to their introduction to the process necessitates that the closure device be of large size. Because of their large size and because of the pressure and vacuum conditions of the process, the closure devices would be very difficult to handle manually. Automatic closure device operators that would be affixed to a free-standing, rotating drum would be complicated and because it is a requirement of the instant process to rotate the drum for a time period during which the closure device is open, the closure device and its operator must not interfere with the ability of the drum to rotate under these circumstances.

With reference to FIG. 1, the vessel A is equipped with piping 90 for the selective addition of steam and piping 92 for the selective addition of water, with suitable valves being utilized in order to control the flow. The steam piping and the water piping are combined into a single injection pipe 94 as shown in FIG. 1, enabling steam and water to be conducted through the sidewall of the vessel A and then injected into the open end of the drum D, through curved fixed pipe 95.

Figure 9:
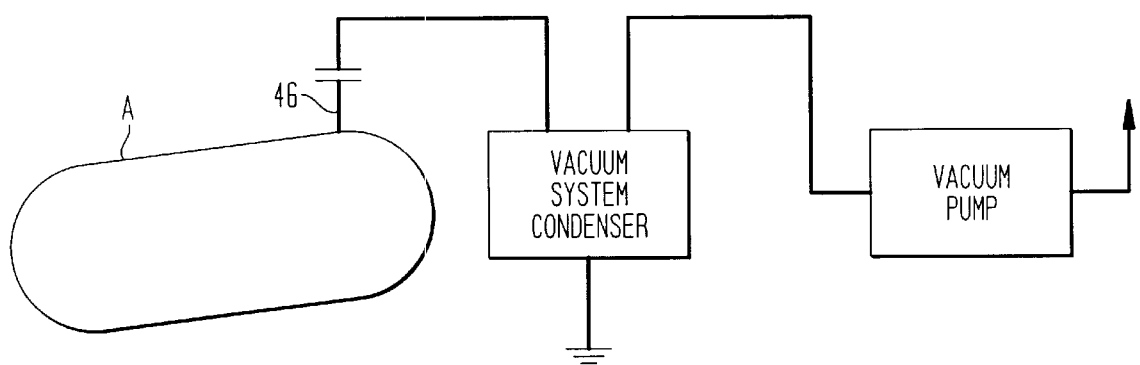
FIG. 9 is a schematic of a vacuum system used in connection with the present invention.
Figure 10:
FIG. 10 is a photograph showing a separated pulped paper phase and an agglomerated polymer phase as it is discharged from a pressure vessel in accordance with the present invention.

During one phase of the operation of the device, vacuum is induced into the vessel A by a vacuum system such as the type manufactured by Nash Engineering Company of Norwalk, Conn. or Croll-Reynolds Company, Inc. of Westfield, N.J., connected to the vessel by vacuum connection 46; note FIG. 9.

In accordance with the process of this invention, paper-containing and plastic-containing waste is carried by a suitable conveyor and introduced through the inlet opening 30, when the door 40 has been moved to the open position, and into the open end 50 of the drum D. As the waste is not packaged in any particular size and may also contain an assortment of materials varying in size, shape and density, and which may not necessarily be free flowing, the inlet opening 30 in the vessel A and the opening 50 into the drum are large enough and without obstructions so as to allow previously unprocessed waste to be directly introduced into the processor.

The drum D is rotated in the first rotative direction while the waste is being conveyed into the drum, and, by virtue of the helical flighting 80 and the angle of incline of the drum, a sufficient amount of the material, though not free flowing, will be loaded into the drum for processing.

When the drum D has been filled with a sufficient amount of material to be processed, the closure device 40 is closed and is secured by a locking ring 42, such as the type manufactured by the Klinge Products Company of Denmark.

Typically a substantial amount of water is added to the waste to be processed, this being accomplished by injecting water through pipe 92, such that sufficient water is brought into contact with the material in the drum, via the curved stationary pipe 95. Moisture is usually added to accomplish moisture content of between 30 percent and 90 percent in the moisture absorbable materials, with approximately 75 percent being the optimum. The drum D is ordinarily rotated in the first rotative direction during the water addition to enhance the contact of the waste materials with the added moisture. The chemical aid is also added either as vapor or solution to facilitate the defibering of paper fraction of the waste. The water and/or the chemical aids may also or alternatively be introduced before the drum door has been closed and locked.

In the first rotative direction, assumed to be clockwise when viewed from the open end of the drum, material is intercepted by the directional flighting 80 and is moved through the drum toward the back or closed lower end 56 of the drum. Simultaneously, the bi-directional lifting paddles 70, by virtue of the angular portion of each paddle, direct a portion of the waste material counter-currently toward the inlet end of the drum as each of the paddles comes in contact with the material during the rotation of the drum. This simultaneous backward and forward movement of materials within the drum by the action of the helical flighting 80 and the surfaces 76 of the novel lifting paddles 70 during the rotation of the drum D in the desired direction results in a highly advantageous and a very complete agitation of the materials being processed. Because of these actions and the added moisture, the repulping of the pulpable materials of the waste materials is very effectively accomplished.

The surfaces 76 are preferably considered as the first portions, and the surfaces 75 of the paddles are considered as the second portions.

Heat is added to the vessel during the processing of the waste materials. In this case, steam may be advantageously added to the vessel by steam piping 90 and injected into the waste materials by injection piping 94 while the drum is being rotated in the first rotative direction; note FIG. 1. As previously described, the addition of heat causes the plastic materials to become softened and to separate while the drum is being rotated, thus allowing the paper fraction that is in close contact with plastic to be completely agitated and contacted with the added moisture and added heat. Desired pressure is maintained in the vessel A by suitable use of the valves of the pressure control system associated with the pressure pipe 60 and the vent connection 62. Valve 61a controls the pressure pipe, and valve 61b the vent pipe 62. Pipe 68 forms the connection to the interior of vessel A. The chemical aid as described previously can be additionally added as a liquid or a vapor into the steam line, or alternatively into the water line.

A temperature of at least 100° C. is maintained for a period of at least 45 minutes at a pressure of approximately 15 psig during the processing of the waste materials to accomplish the pulping of the waste paper. Heat is added by the injection of steam to attain the required temperature, this being accomplished from the previously described piping, and pressure resulting from the injection of the steam is controlled and maintained by the pressure control system connected to the vent piping.

When processing has been completed, the steam injection to the system is shut off and the vacuum system depicted in FIG. 9 is turned on while continuing to rotate the drum in the first rotative direction. As a vacuum is induced on the vessel, moisture is withdrawn from the processed materials through vacuum connection 46 and into the vacuum system, and collected for reuse in future processing or for discharge.

The amount of water that is added to the process will be absorbed by the moisture absorbable materials that are in the waste during processing and will not generally exist in a pool in the vessel as the vacuum is being applied.

Additionally, as the vacuum is induced on the system, the temperature of the boiling point of the water is reduced and the water is vaporized and withdrawn from the system into the vacuum system. The greater the intensity of the vacuum that is induced on a system, the greater is the decrease in the boiling point of the water that is exposed to the vacuum in the system. For instance, at approximately 5 lbs. of absolute pressure, water will boil at approximately 72° C. and at approximately 1 lb. of absolute pressure, water will boil at approximately 40° C.

Drying techniques such as vacuum evaporation and freeze-drying utilize this phenomenon to accomplish low heat drying.

As high temperatures are utilized during the processing and these temperatures are significantly higher than the atmospheric boiling point of water, when vacuum is applied on the system, it causes a rapid evolution of moisture to vapor and therefore a rapid drying effect of the materials that are in the processor. Another benefit of the evaporative effect of moisture loss in this manner is the resulting cooling of the materials that have been processed that they may more easily be handled in subsequent operations as described previously. Under these conditions, even pooled water will evolve into vapor and be withdrawn from the system.

It is preferable to use a vacuum connection at the top of the vessel in that the evolving vapor, as it is being withdrawn from the system, can act as a carrier gas and, by its velocity, can carry light particles with it out of the vessel and into the vacuum system and potentially clog it. By placing the nozzle at the top of the vessel, gravity will make this action less likely. The installation of the nozzle is also at a point that causes a tortuous path to be followed by the vapor, further preventing particles from being carried into the vacuum system in that a change in direction of a carrier gas stream will cause the deposition of particles that are being carried from the gas stream.

It is also to be noted that the installation of the nozzle on the top of the shell of the vessel causes the vapor evolving from the materials in the drum to travel out of the opening 50 of the drum and to turn back along the interior perimeter of the shell of the vessel to reach the nozzle and by virtue of the change in direction of the vapor stream at the opening of the drum, to deposit particles that may be carried in the vapor stream at the opening of the drum.

As the vacuum is induced and the moisture is withdrawn from the system, the processed materials are cooled from the temperature of repulping to a lower, more manageable temperature for further handling. As is obvious to those skilled in the art, the coolness and the dryness of the processed materials are variables and are dependent on the subsequent requirements of further handling in a particular operation. In this case, a dryness of approximately 60 to 75 percent moisture in the moisture absorbable materials and a corresponding temperature of approximately 30° C. is preferred.

If additional cooling needs to be accomplished beyond that attained as a consequence of moisture removal, air can be drawn into the system through vent connection 62 while the vacuum system continues to operate and, in this manner, additional cooling of the materials can be accomplished.

When the required temperature and dryness are accomplished, the vacuum system is turned off and the rotation of the drum is stopped. The closure device 40 is opened and the drum D is rotated in the second rotative direction. In the second rotative direction, assuming counterclockwise rotation, the processed waste materials are intercepted by the helical flighting 80 and are directed toward the inlet end of the drum D by the action of the helical flighting. As the drum continues to rotate, the processed materials are also lifted and directed toward the inlet end of the vessel by the surfaces 75 of the "Y" shaped lifting paddles 70, as previously described.

As should now be clear, the angular surfaces 75 and 76 on each side of the perpendicular surface of the paddles, function in an equal manner in either rotative direction, assisted of course in each instance by the vertically disposed member 72.

It is to be noted that the lifting paddles 70 are functioning in a counter-current or refluxing manner with respect to the helical flighting 80 during processing, with the surfaces 76 serving in a primary manner at such time. Only after the waste materials have been fully processed the rotative direction of the drum D is reversed, so as to enable the helical flighting to discharge the material out over the lip 51 of the drum into a suitable discharge system. At this time of discharge, the surfaces 75 of the paddles 70 serve in a primary manner, in effect cooperating with the action of the helical flighting 80.

The processed materials are thus discharged from the vessel by the combined action of the helical flighting 80 and the surfaces 72 and 75 of the lifting paddles 70 during the rotation of the drum D in the second rotative direction. Because the outer lip 51 of the drum protrudes beyond the outer rim of the vessel A, the discharged processed materials fall clear of the vessel. By virtue of the repulping of the pulpable materials, the volume of the processed waste material is reduced to approximately ⅓ of its original volume.

The rate of discharge of the processed materials, as is apparent to those skilled in the art, is dependent on the rate of rotation of the drum, the size and frequency of the helical flighting, and the size and number of the lifting paddles and these variables are dependent on the amount of material to be processed in a given amount of time and are not limited to a single combination of these variables.

Drain connection 64 is equipped with a suitable valve 66, which can be opened to enable moisture to be drained from the shell (pressure vessel A) upon excess accumulation thereof.

The processed materials are then directed to screeners for the separation and recovery of recyclable pulped fraction and further to collect the separated plastic materials. As described previously, the pulped fraction can then be subjected to further processing step to form recycled paper sheet, tissue or board.

This invention is further illustrated by the following examples which are provided for illustration purposes and in no way limit the scope of the present invention.

EXAMPLES

The basics procedure was similar for Examples 1–5 and Comparative Examples 1A, 3A and 5A which follow. Utilizing a rotating apparatus as described above (sometimes referred to in the art as a Rotoclave® apparatus, available from Tempico, Inc., Madisonville, La., USA), the desired amount of material was placed into the drum by allowing the rotational motion of the augured vanes to draw it into the chamber. Water was added to a consistency of typically approximately 20%. Other processing chemicals (such as hypochlorite and/or caustic), if any, were also added at this time. The vessel door was closed and sealed, and a vacuum was drawn in the chamber for one minute. (The purpose of the vacuum is to facilitate the rapid penetration of the steam.) At the end of the vacuum draw period the vacuum was shut off and the system was isolated by closing the valve. Steam was then introduced through a steam inlet valve until the desired operating temperature and pressures were reached. Upon reaching the temperature and pressure conditions, the rotation of the drum was started and the rotation continued for a preset time. Steam was used to maintain the temperature and pressure throughout the reaction time. After the reaction time was finished, the steam valve was closed, and the drum was vented to atmospheric pressure, which, in turn, also reduced the temperature. Following the venting operation, a vacuum was drawn to further reduce the temperature of the pulp for safe handling before opening the door. The drum was then once again vented to the atmosphere and the door was opened. The material inside the drum was then removed by reversing the drum rotation so that the augur vanes brought the charge to the front of the drum where it then exited onto a carrier belt which took it to the dry vibrating coarse screen. The vibrating screen removed most of the coarse material, and the remaining accepts were then sent to a conventional pulper for consistency dilution and subsequent wet screening and cleaning.

The stock was then diluted in a conventional pulper to reduce consistency. Upon exit of the pulper, the stock first passed through a Beloit Belpurge detrasher, and then a fine screen. The process flow was designed so that screen accepts were collected in one chest and screen rejects were collected in a barrel. A quantity of accepts was thickened and saved, and analyzed.

For the additional cleaning operation on the UV coated material, a small quantity of screen accepts was placed in a tank for cleaning and recirculation. Two different cleaners were used on this material. In both cases, the stock was diluted and agitated. Inlet and accept isolation valves were used independently for each of the two cleaners. Accept and reject flows were collected. The Beloit Uniflow, a light weight contaminant removal cleaner was used for one of the test cells and results showed that the Uniflow did not remove contaminants effectively. The Beloit Posiflow, a heavy weight contaminant removal cleaner was used as the second test cell and it was effective.

Handsheet preparation and physical testing was then done according to TAPPI Standard T205 sp-95, the disclosure of which is incorporated herein by reference.

Several observations are noteworthy here. While pulp coloration was noticeable and caused some concern, it was found that pulp coloration was largely contained in the liquor. Moreover, besides successful defibering, an advantage of the poly agglomerates formed is that color and other contaminants end up or are collected by the polymer agglomerates formed and the polymer containing waste has a synergistic effect when used with inked waste paper, for example. Finally, some degree of shredding of the wastepaper appears to be required to facilitate complete defibering in the Rotoclave® apparatus.

Example 1

In this Example 1, a rotating apparatus of the class described above (sometimes referred to as a Rotoclave® pressure vessel) having a 1.5 meter diameter drum was used. The shell of the vessel was 3.7 meters long, inside of which was a rotating drum as described herein. The drum was driven by a 7.5 kW variable speed motor, with a final speed range of from 1.2 to 12 rpm. The volume of the drum is 8150 liters.

Dry screening utilized a 610 mm×1220 mm vibrating screen. The screening size was 38 mm×19 mm diamond shaped openings. The screen was driven by a ⅕ kW 1750 rpm motor.

Downstream screening operations first utilized Beloit Belpurge 2 vaned rotor and a screen with ⅜ "holes. Following this, a fine screen was used which consisted of a 457 mm horizontal retrofit screen, driven by a 55 kW variable frequency, variable speed drive. Actual screening utilized a Beloit S-Rotor and a 0.20 mm slotted RSC style screen with 8 slots/inch and 3.88% open area.

The Posiflow cleaning operation was carried out using a 660 liter "bath tub" cleaner stand. The unit was self contained, and consisted of a feed tank and a pump, and a set of headers onto which various cleaners could be installed. Flows and pressures were regulatable. Reject rates were obtained using a calibrated container and a stopwatch.

Waste material used in this Example is a 50:50 mixture of two-sided plastic coated paperboard having wet strength resin and two-sided plastic coated paperboard having no wet strength resin. The waste having the wet strength resin was mostly derived from milk cartons and unprinted strips of paper. The waste having no wet strength resin contained mostly ice cream containers and some newspaper.

300 lbs. of above mentioned mixture of waste materials was fed into the drum contained in the pressure vessel as follows. The waste materials were drawn into the drum by allowing the first rotational motion of the drum as described previously. That is by virtue of the helical flighting and the angle of incline of the drum, all of the 300 lbs. of waste materials was loaded into the drum.

At this time, 900 lbs. of water was added to bring about total concentration of wastes to about 25 weight percent. Then 12 lbs. of sodium hydroxide was introduced into the drum as solution in suitable amounts of water so as to bring the caustic concentration in the mixture to an one weight percent level. The vessel door was closed and sealed, and a vacuum was drawn in the chamber for one minute. One of the purposes of applying vacuum at this stage was to facilitate the rapid penetration of the steam. At the end of the vacuum draw period the vacuum was shut off and the system was isolated by closing the valve.

Steam was then introduced through a steam inlet valve until the desired operating temperature of about 135° C. and pressure of about 45 psig were reached. As soon as the internal temperature of 135° C. and pressure of 45 psig were reached, the rotation of the drum was started and rotation was continued for a period of about 60 minutes. The drum was rotated at a speed of about 6 rpm throughout this time. Steam was used to maintain the temperature and pressure throughout this reaction time. At the end of this 60 minute period, the steam valve was closed, and the drum was vented to atmospheric pressure, which, in turn, also reduced the internal temperature. Following the venting operation, a vacuum was drawn to further reduce the temperature of the pulp for safe handling before opening the door. The drum was then once again vented to the atmosphere and the door was opened. The material inside the drum was then removed by reversing the drum rotation so that the helical flighting brought the charge to the front of the drum where it is then exited onto a carrier belt which took it to the dry vibrating coarse screen. The vibrating coarse screen removed most of the coarse material, and the remaining accepts were then sent to a conventional pulper for consistency dilution and subsequent wet screening and cleaning.

The stock was then diluted in a conventional pulper to reduce consistency. Upon exit of the pulper, the stock first passed through a Beloit Belpurge detrasher, and then a fine screen. The process flow was designed so that screen accepts were collected in one chest and screen rejects were collected in a barrel. A quantity of accepts was thickened and used for analysis. The results were as follows.

Greater than 90 percent of the pulp was defibered and no large sheets of paper were present in it. A few strips of paper remained in the pulp. Almost all of the plastic was removed. The pulp contained no nodules but contained small pieces of contaminants. The color of the pulp was brownish, while the liquor was darker brown in color. Further analysis of the pulp also showed that it is essentially sterile.

Handsheets were made from this pulp for visual evaluation. (Again, according to TAPPI T205 sp-95) Visual examination confirmed that the pulp from this experiment to be readily usable in a commercial secondary fiber papermaking operation.

Comparative Example 1A

This Comparative Example 1A illustrates that in the absence of chemical aid, no appreciable amounts of defiberation of pulping takes place.

Example 1 was repeated substantially using essentially all of the same starting waste materials in the Rotoclave vessel with the exception of the addition of sodium hydroxide.

The treatment of the waste was carried out under same conditions as described in Example 1 for a period of about 60 minutes at a temperature of 135° C. and pressure of 45 psig. At the end of this time period, the reactor was vented, vacuum was applied following the procedures of Example 1. The paper fraction so discharged from the reactor was mostly large sheets of paper and many strips of paper were also observed. No defiberation of the paper fraction was evident. Thus treated paper fraction was not suitable for further processing in a pulper for any recycling operation.

Example 2

This Example 2 illustrates that use of a mixture of sodium hydroxide and hydrogen peroxide as chemical aid during processing of the waste results in complete defiberation of the pulped paper fraction.

Example 1 was substantially repeated in this Example 2 except for the following changes:

The waste materials (300 lbs.) were mixed with 1200 lbs. of water to provide a solid concentration of about 20 weight percent. A mixture of 45 lbs. of sodium hydroxide and 30 lbs. of 50% solution of hydrogen peroxide were added to the drum after addition of water to provide about 3% concentration of caustic and 1% concentration of peroxide. The drum was rotated at a speed of 12 rpm while maintaining the temperature and pressure conditions respectively at 135° C. and 45 psig for a period of about 60 minutes.

At the end of this reaction time, the drum was opened in accordance with the procedures set forth in Example 1. The discharged paper fraction was completely pulped, substantially defibered and was dark brown in color. All of the plastic coating was removed from the pulped paper fraction. The entire non-pulped plastic fraction was agglomerated of varying sizes.

Example 3

This Example 3 illustrates that the color of the pulped paper fraction may be controlled by a combination of lower temperature, lower concentration of waste materials and by the amount of chemical aid used.

Example 1 was substantially repeated in this Example 3 with the exception of the following.

200 lbs. of the waste materials were mixed with 1800 lbs. of water to provide a 10% of waste concentration in the processor. A mixture of 20 lbs. of sodium hydroxide and 40 lbs. of 50% hydrogen peroxide was introduced into the drum as chemical aid at the beginning of the reaction following the procedures of Example 1. The temperature and pressure were respectively maintained at 110° C. and 18 psig, and the drum was rotated at a speed of 12 rpm for a period of about 60 minutes.

The pulped paper fraction so produced was mostly defibered. No large sheets of paper were present, but a few strips of paper were observed. Almost all of the plastic was separated, agglomerated as large nodules and some small pieces of plastic were also observed. The color of pulped paper fraction was light amber and liquor was also light amber in color.

Comparative Example 3A

This Comparative Example 3A illustrates that in the absence of chemical aid no defibering of paper fraction takes place even under conditions of Example 3, as observed in Comparative Example 1A.

Example 3 was substantially repeated with the exception of the addition of chemical aid. At the end of the reaction time it was observed that very little defiberation of the paper fraction took place. The paper fraction was present mostly as large sheets of paper, with many strips of paper. Most of the plastic coating was however removed, which was agglomerated into large nodules with small pieces of plastic was present. The paper fraction was white in color and the liquor was clear.

Example 4

This Example 4 illustrates the processing of waste materials containing predominantly two-sided plastic coated with wet strength resin in the presence of a chemical aid.

Example 1 was substantially repeated with the exception of the following amount of waste, water, caustic, and the reaction conditions:

| Waste Material | Two-sided plastic coated waste having wet strength resin - mostly milk carton and some unprinted paper. |
|---|---|
| Amount Used | 200 lbs. |
| Water | 800 lbs. |
| Waste Concentration | About 20% |
| Sodium Hydroxide | 30 lbs. (about 3%) |
| Speed of Rotation | 12 rpm |
| Temperature | 135° C. |
| Pressure | 54 psig |
| Time | 60 minutes |

At the end of the reaction time, the product was discharged and carried through the carrier belt to the vibrating coarse screen having a screen size of 1¾"×¾" holes. As the pulped paper fraction exited the vessel first, large white plastic balls of varying size up to 24"×18" were also removed from the reaction vessel, readily separating from the pulped paper fraction.

The pulped paper fraction stock was then diluted to about 4% consistency and passed through pulper-slusher and then through Beloit Belpurge detrasher having ⅜" holes, where additional small pieces of agglomerated plastic balls and other rejects were removed. Then the stock was further diluted to about 3% consistency and passed through screen feed chest and then to a fine screen having 0.008" slots. The screen accepts were collected in a Screen Accept Chest and the rejects in a barrel. The screen accepts were then subjected to a centrifuge to a concentration of about 30% to obtain the final product for forming handsheets, which were used in the physical testing in accordance with TAPPI standards as noted above. The dirt count of handsheets are as follows:

| Fine Screen Inlet Dirt Counts | | | | |
|---|---|---|---|---|
| Dirt Count (PPM) | | | % Difference* | |
| 0.002–0.04 mm² | 0.04 mm² & up | Total | TAPPI | Total |
| 37 | 136 | 173 | −89.2% | −89.9% |

*based on baseline from UV printed furnish trial. See Example 5A

Example 5

This Example 5 illustrates the processing of waste materials containing plastic coated waste material and UV printed/cured wastepaper in the presence of a chemical aid such that the separated plastic acts as a collector of UV inks, thus minimizing the downstream operations.

Example 1 was substantially repeated with the exception of the following amount of waste, water, caustic, and the reaction conditions:

| Waste Material | 50% Hallmark Chrome - UV Printed; 25% two-sided plastic coated waste having wet strength resin; and 25% two-sided plastic coated waste having no wet strength resin. |
|---|---|
| Amount Used | 200 lbs. |
| Water | 800 lbs. |
| Waste Concentration | About 20% |
| Sodium Hydroxide | 30 lbs. (about 3%) |
| Speed of Rotation | 12 rpm |
| Temperature | 135° C. |
| Pressure | 54 psig |
| Time | 60 minutes |

At the end of the reaction time, the product was discharged and carried through the carrier belt to the vibrating coarse screen having a screen size of 1¾"×¾" holes. As the pulped paper fraction exited the vessel first, large white plastic balls of varying size were also removed from the reaction vessel, readily separating from the pulped paper fraction. The plastic balls were smaller in size than the ones formed in Example 4 but of blue/white color with intense blue zones.

The pulped paper fraction stock was then diluted to about 4% consistency and passed through pulper-slusher and then through Beloit Belpurge detrasher having ⅜" holes, where additional small pieces of agglomerated plastic balls and other rejects were removed. Then the stock was further diluted to about 3% consistency and passed through screen feed chest and then to a fine screen having 0.008" slots. The screen accepts were collected in a Screen Accept Chest and the rejects in a barrel. The screen accepts were then subjected to a centrifuge to a concentration of about 30% to obtain the final product for forming handsheets, which were used in the physical testing in accordance with TAPPI standards. The dirt count of handsheets are as follows:

| Fine Screen Inlet Dirt Counts | | | | |
|---|---|---|---|---|
| Dirt Count (PPM) | | | % Difference* | |
| 0.002–0.04 mm² | 0.04 mm² & up | Total | TAPPI | Total |
| 44 | 292 | 336 | −76.8% | −80.5% |

*based on baseline from UV printed furnish trial. See Example 5A

Comparative Example 5A

This Comparative Example 5A illustrates the processing of waste materials containing UV cured/printed waste in the presence of a chemical aid, which requires further processing steps to deink the waste materials.

Example 1 was substantially repeated with the exception of the following type of waste, amount of waste, water, caustic, and the reaction conditions:

| Waste Material | A mixture of Hallmark chrome - UV printed, two-sided glossy printer trimmings, some ice cream tops, and some unprinted colored paper. |
|---|---|
| Amount of Waste Used | 200 lbs. |
| Water | 800 lbs. |
| Waste Concentration | About 20% |
| Sodium Hydroxide | 30 lbs. (about 3%) |
| Speed of Rotation | 12 rpm |
| Temperature | 135° C. |
| Pressure | 54 psig |
| Time | 60 minutes |

At the end of the reaction time, the product was discharged and carried through the carrier belt to the vibrating coarse screen having a screen size of 1¾"×¾" holes. As the pulped paper fraction exited the vessel, some specky ink particles were removed from the fiber. As expected, there were no plastic balls.

The pulped paper fraction stock was then diluted to about 4% consistency and passed through a pulper-slusher and then through a Beloit Belpurge detrasher having ⅜" holes, where additional small pieces of agglomerated plastic balls and other rejects were removed. Then the stock was further diluted to about 3% consistency and passed through screen feed chest and then to a fine screen having 0.008" slots. The screen accepts were collected in a Screen Accept Chest and the rejects in a barrel. The screen accepts from this example was further cleaned as follows.

A small quantity of screen accepts was placed in the bathtub tank for cleaning and recirculation. Three different cleaners were used on this material. In all cases, the stock was diluted and agitated. Inlet and accept isolation valves were used independently for each of the three cleaners. Accept and reject flows were collected. The Beloit Uniflow, a lightweight contaminant removal cleaner, was used in one of the test cells; the results showed that the Uniflow did not remove contaminants effectively. The Beloit Posiflow, a heavy weight contaminant removal cleaner, was most effective. The flotation Denver Cell provided the intermediate result.

Ink Removal Results

| Sample | Dirt Count (PPM) | | | % Reduction | |
|---|---|---|---|---|---|
| | 0.002–0.04 mm$^2$ | 0.04 mm$^2$ & up | Total | TAPPI | Total |
| Screen Accepts | 483 | 603 | 1086 | | |
| Denver Cell Accepts | 66 | 211 | 277 | 65% | 74.5% |
| Posiflow Accepts | 83 | 113 | 195 | 81.3% | 82.0% |
| Uniflow Accepts | 169 | 368 | 537 | 39.0% | 50.6% |

The higher the percentage dirt count reduction, the more effective the repulping process has been at removing the ink particles from the fibers, and/or the more efficient the cleaning process is. In this work three different cleaning processes were tried with the UV pulp from Example 5A. These three cleaning processes are commercially available, and represent typical cleaning operations to be found in a deinking mill. The 81–82% dirt count reduction from the Posiflow accepts and the 65–75% reductions from the Denver cell accepts clearly show that the repulping process has removed the UV ink particles from the fibers. By itself, no such conclusion would be reached as readily when evaluating the Uniflow accepts data. But when taken along with the Denver cell and Posiflow cell data, the conclusions are that the UV ink particles have been effectively removed from the fibers; and the Posiflow cleaning system is the most efficient of the three processes for removing the separated ink particles from the pulp slurry, followed by the Denver cell system and then the Uniflow system in decreasing order of efficiency.

To determine the fine screen inlet dirt counts, without the special handling of the pulp to remove the color bodies, the screen accepts were also centrifuged to thicken and the thickened accepts were formed into handsheets for dirt count analysis. The results (UV printed baseline) are as follows:

Fine Screen Inlet Dirt Counts

| Dirt Count (PPM) | | | % Difference* | |
|---|---|---|---|---|
| 0.002–0.04 mm$^2$ | 0.04 mm$^2$ & up | Total | TAPPI | Total |
| 462 | 1258 | 1720 | | |

A comparison of the Image Analysis evaluation of the accepts from the vibration screen from the trials in Examples 4, 5 and 5A supports the observation that some of the free ink from the UV material has been collected by the plastic/polymeric materials making up the "poly balls".

Based on a 50/50 blend of the milk carton material used in example 4, and the UV material used in Example 5A, theoretical calculated average values were obtained.

| | Dirt Count (PPM) | | % Difference | |
|---|---|---|---|---|
| | 0.002–0.04 mm$^2$ | 0.04 mm$^2$ & up | Total TAPPI | Total |
| calculated average | 250 | 697 | 947 −44.6% | −44.9% |

Comparing the results from Example 5, which used a blend of materials with the calculated theoretical value suggests that some of the inks which were introduced with the UV coated material were actually collected by the plastic/polymeric material from the milk carton, and rejected on the vibrating screen with the plastic.

This Comparative Example 5A clearly demonstrates the need for the process of the present invention whereby the plastic material that is removed from the waste paper products can also be used as a collector of the contaminants especially the color bodies as illustrated in Example 5.

There is thus provided in accordance with the present invention a method of recycling difficult to process waste material selected from the group consisting of polymer coated board having wet strength resin, polymer coated board having no wet strength resin, glossy printer trimmings, two side polymer coated board with and without wet strength resin, two-sided glossy printer trimming, ultraviolet (UV) cured ink coated stocks, and mixtures thereof. In some embodiments, one or more of the waste materials is selected from the group consisting of milk cartons, ice cream containers, ice cream tops, newspaper, unprinted paper, and mixtures thereof. Sometimes, the waste material is essentially a mixture of milk cartons and unprinted strips of paper, or is essentially a mixture of ice cream containers and newspaper. In still other embodiments, the waste material is essentially a mixture of single or two-sided glossy printer trimmings, ice cream tops and unprinted colored paper.

Generally, the weight percent of waste solids (that is, non-pulpable material) in the waste materials is in the range of about 0.25 weight percent to about 60 weight percent based on the total dry weight of the waste materials; whereas, the weight percent of waste solids in the waste materials may otherwise be in the range of about 0.05 weight percent to about 35 weight percent based on the total dry weight of the waste materials.

Chemical aids generally include at least one chemical selected from the group consisting of alkaline agent, buffer, bleaching agent, detergents, surfactants, solvents, dispersants, chelating agents, sequestrants, and mixtures thereof. A preferred alkaline agent is sodium hydroxide, whereas preferred bleaching agents are hydrogen peroxide or sodium hypochlorite.

The pressure vessel is generally an elongated vessel of cylindrical configuration mounted to be driven in rotation about its longitudinal axis, the vessel having an inlet at one end and an outlet at the other end, and is provided with agitating means including an array of fixed lifting paddles present in the interior of said vessel. The agitation of the waste materials comprises the action of the lifting paddles in the vessel, concurrent with rotation of said vessel. Typically, the vessel is also provided with a helically configured member. Further, an additional amount of moisture may be added to the waste material in the vessel in order to accomplish repulping of the paper components of the waste. Such additional amount of moisture is introduced in the form of steam to provide thermal energy and reduce the time of repulping. The additional amount of moisture usually is added to the waste material in the vessel during rotation of the pressure vessel in the form of steam, whereby steam penetrates the waste material to assist in sterilization of the waste. Typically, a sufficient amount of steam is introduced during the agitation step so as to bring about internal temperature in the range of about 100° C. to about 140 ° C. and pressure in the range of about 10 psig to about 35 psig. A temperature of at least about 110° C. and a pressure of at least about 5 psig to reduce the time required to accomplish pulping is preferred.

Conditions are controlled so that the time required to accomplish pulping is generally from about 40 to 90 minutes, and typically the time required to accomplish repulping may be about 60 minutes.

In general, where a sufficient amount of steam is introduced during the agitation step so as to bring about an internal temperature of about 135° C. and a pressure of about 30 psig to reduce the time required to accomplish repulping which may be about 40 to 80 minutes in some cases; again, the time required to accomplish pulping is typically about 60 minutes or less. Preferably, at least about 80 percent of the pulp is defibered, and most preferably, at least 90 percent of the paper is defibered. In almost all cases, defibering at least 65 percent of the paper present is desirable.

Typically, the waste paper contains no more than about 60 weight percent of polymeric waste material based on the total weight of paper pulp and polymeric waste material. In some cases, the waste materials contain less than about 10 percent of polymeric waste material based on the total weight of the pulp and the polymeric waste material.

In practice, the inventive process further includes utilizing the pulped paper fraction of the waste for the production of a recycle fiber-containing paper product such as recycle fiber-containing paperboard suitable for making paper plates, or recycle fiber-containing absorbent paper sheet, or recycle fiber-containing paper tissue, or recycle fiber-containing paper towel, or newsprint paper, or recycle fiber-containing cardboard product, including recycle fiber-containing corrugated cardboard paper product. So also, recycle fiber-containing writing paper is readily prepared.

While any suitable feedstock may be utilized, the waste materials typically include inked paper products, including ultraviolet (UV) light cured ink coated paper products. Preferably, the pulp is essentially de-inked and the inks are substantially collected in the agglomerated polymeric material in the inventive process.

In preferred embodiments, the rotating drum apparatus is rotated at a speed of at least about 8 revolutions per minute (rpm), with at least about 10 rpm being preferred. The consistency of the wastepaper/water mixture introduced into the drum is generally at least about 10 percent (i.e., 10 percent solids) and typically at least about 20 percent solids. As noted above, the drum is typically provided with a helical baffle about its interior, the interior of the drum is maintained at a temperature of at least about 110° C. while rotating the drum, and an alkaline agent such as sodium hydroxide is present in water solution at a concentration of at least about 1% based on the weight of water and sodium hydroxide introduced into the inclined drum. More typically, sodium hydroxide is present in water solution at a concentration of at least about 2% based on the weight of water and sodium hydroxide introduced into the inclined drum, while preferably in some cases sodium hydroxide is present in water solution at a concentration of at least about 3% based on the weight of water and sodium hydroxide introduced into the inclined drum.

In particularly preferred embodiments of the present invention, the coated waste paper stock comprises a mixture of UV cured coated waste paper stock and waste paper stock provided with a polymer other than a UV cured polymer.

Although the invention has been illustrated by certain of the preceding examples, it is not to be construed as being limited thereby; but rather various modifications and embodiments can be made without departing from the spirit and scope of the invention as set forth in the appended claims.

What is claimed is:

1. A process for recycling waste materials including waste paper and polymeric waste material comprising the steps of:
    a) introducing said waste paper, polymeric waste material and water into a pressure vessel mounted to rotate about an inclined axis equipped with suitable agitating means to thoroughly mix said solid waste;
    b) introducing into said pressure vessel suitable chemical aids to facilitate defibering of the paper fraction of said waste;
    c) agitating said waste materials in said vessel by way of said agitating means at an elevated temperature and pressure for a sufficient time to accomplish repulping of the moisture absorptive paper fraction, such that the separation of component fractions by density and size can thereafter be accomplished; and
    d) discharging said separated waste materials from said vessel, whereby said pulped paper fraction is substantially defibered and substantially free of said polymeric waste material and said polymeric waste material is generally agglomerated and operative to concentrate contaminants including color bodies from said waste.

2. The process as set forth in claim 1 wherein said waste material is selected from the group consisting of polymer coated board having wet strength resin, polymer coated board having no wet strength resin, glossy printer trimmings, two side polymer coated board with and without wet strength resin, two-sided glossy printer trimmings, ultra-violet (UV) cured ink coated stocks, and mixtures thereof.

3. The process as set forth in claim 1 wherein one or more of said waste materials is selected from the group consisting of milk cartons, ice cream containers, ice cream tops, newspaper, unprinted paper, and mixtures thereof.

4. The process as set forth in claim 1 wherein said waste material is essentially a mixture of milk cartons and unprinted strips of paper.

5. The process as set forth in claim 1 wherein said waste material is essentially a mixture of ice cream containers and newspaper.

6. The process as set forth in claim 1 wherein said waste material is essentially a mixture of single or two-sided glossy printer trimmings, ice cream tops and unprinted colored paper.

7. The process as set forth in claim 1 in which the weight percent of waste solids in said waste materials is in the range of about 0.25 weight percent to about 60 weight percent based on the total dry weight of said waste materials.

8. The process as set forth in claim 1 in which the weight percent of waste solids in said waste materials is in the range of about 0.05 weight percent to about 35 weight percent based on the total dry weight of said waste materials.

9. The process as set forth in claim 1 wherein said chemical aids include at least one chemical selected from the group consisting of alkaline agent, buffer, bleaching agent, detergents, surfactants, solvents, dispersants, chelating agents, sequestrants, and mixtures thereof.

10. The process as set forth in claim 9 wherein said alkaline agent is sodium hydroxide.

11. The process as set forth in claim 9 wherein said bleaching agent is hydrogen peroxide or sodium hypochlorite.

12. The process as set forth in claim 1 wherein said chemical aid is a mixture of sodium hydroxide and hydrogen peroxide.

13. The process as set forth in claim 1 wherein said chemical aid is sodium hydroxide.

14. The process as set forth in claim 1 wherein said vessel is an elongated vessel of generally cylindrical configuration mounted to be driven in rotation about its longitudinal axis, such vessel having an inlet at one end and an outlet at the other end.

15. The process as set forth in claim 1 wherein said agitating means comprises an array of fixed lifting paddles present in the interior of said vessel.

16. The process as set forth in claim 15 wherein said agitation of said waste materials comprises the action of the lifting paddles in said vessel, concurrent with rotation of said vessel.

17. The process as set forth in claim 16 in which steam is added to said waste material in said pressure vessel during said rotation of said pressure vessel, whereby steam penetrates said waste material to assist in sterilization of the waste.

18. The process as set forth in claim 17 wherein sufficient amount of steam is introduced during said agitation step so as to bring about internal temperature in the range of about 100° C. to about 140° C. and pressure in the range of above 0 psig to about 35 psig.

19. The process as set forth in claim 17 wherein sufficient amount of steam is introduced during said agitation step so as to bring about an internal temperature of about 110° C. and a pressure of at least about 5.0 psig to reduce the time required to accomplish pulping.

20. The process as set forth in claim 19 in which the time required to accomplish pulping is about 40 to 90 minutes.

21. The process as set forth in claim 19 in which the time required to accomplish repulping is about 60 minutes.

22. The process as set forth in claim 17 wherein sufficient amount of steam is introduced during said agitation step so as to bring about an internal temperature of about 135° C. and a pressure of about 30 psig to reduce the time required to accomplish repulping.

23. The process as set forth in claim 22 in which the time required to accomplish repulping is about 40 to 80 minutes.

24. The process as set forth in claim 22 in which the time required to accomplish pulping is about 60 minutes.

25. The process as set forth in claim 1 wherein said vessel is provided with a helically configured member.

26. The process as set forth in claim 1 in which an additional amount of moisture is added to said waste material in said vessel in order to accomplish repulping of the paper components of the waste.

27. The process as set forth in claim 26 wherein said additional amount of moisture is introduced in the form of steam to provide thermal energy so as to reduce the time of repulping.

28. The process as set forth in claim 26 in which an additional amount of moisture is added to said waste material in said vessel during said rotation of said pressure vessel.

29. The process as set forth in claim 1 wherein at least 65 percent of said pulp is defibered.

30. The process as set forth in claim 1 wherein at least 90 percent of said paper is defibered.

31. The process as set forth in claim 1 wherein said pulp contains no more than 60 weight percent of said polymeric waste material based on the total weight of said pulp and said polymeric waste material.

32. The process as set forth in claim 1 wherein said waste materials contain less than about 10 percent of said polymeric waste material based on the total weight of said pulp and said polymeric waste material.

33. The process as set forth in claim 1 which further including utilizing said pulped paper fraction for the production of a recycle fiber-containing paper product.

34. The process as set forth in claim 33, wherein said recycle fiber-containing paper product is paperboard suitable for making paper plates.

35. The process as set forth in claim 33, wherein said recycle fiber-containing paper product is an absorbent paper sheet.

36. The process as set forth in claim 33, wherein said recycle fiber-containing paper product is a paper tissue product.

37. The process as set forth in claim 33, wherein said recycle fiber-containing paper product is a paper towel product.

38. The process as set forth in claim 33, wherein said recycle fiber-containing paper product is a newsprint paper product.

39. The process as set forth in claim 33, wherein said recycle fiber-containing product is a cardboard product.

40. The process as set forth in claim 39, wherein said recycle fiber-containing paper product is a corrugated cardboard paper product.

41. The process as set forth in claim 33, wherein said recycle fiber-containing paper product is a writing paper product.

42. The process as set forth in claim 1 wherein said waste materials additionally include inked paper products.

43. The process as set forth in claim 42 wherein said inked paper product is an ultraviolet (UV) light cured ink coated paper product.

44. The process as set forth in claim 43 wherein said pulp is essentially de-inked.

45. The process as set forth in claim 43 wherein said ultraviolet (UV) cured ink is substantially collected in said agglomerated polymeric material.

46. The process as set forth in claim 42 wherein said pulp is essentially de-inked.

47. The process as set forth in claim 46 wherein said ink is substantially collected in said agglomerated polymeric material.

48. A process for recycling waste materials including waste paper and polymeric waste material utilizing a pressure vessel of generally cylindrical configuration mounted to be driven in inclined rotation about its longitudinal axis, wherein said vessel is equipped with an array of fixed lifting paddles adapted to agitate said waste materials and a helically configured member, said process comprising the steps of:
- a) introducing said waste materials and water through an inlet of said vessel;
- b) introducing suitable amounts of chemical aids in order to facilitate defibering of the paper fraction of said waste materials;
- c) rotating said vessel about its longitudinal axis, so as to agitate said waste materials;
- d) adding thermal energy to said waste material and raising the pressure inside said vessel to a level above atmospheric pressure;
- e) continuing to rotate said vessel with added heat to accomplish repulping of the moisture absorptive paper fraction and separation of component fractions by density and size; and
- f) discharging said treated waste materials from said vessel, wherein said pulped paper fraction is substantially defibered and substantially free of said polymeric waste material and other contaminants in said waste materials and wherein said polymeric waste material is operative to concentrate contaminants including color bodies from said waste materials.

49. The process as set forth in claim 48 wherein said waste material is selected from the group consisting of polymer coated board having wet strength resin, polymer coated board having no wet strength resin, glossy printer trimmings, two side polymer coated board with and without wet strength resin, glossy printer trimmings, ultraviolet (UV) cured ink coated stocks, and mixtures thereof.

50. The process as set forth in claim 48 wherein one or more of said waste materials is selected from the group consisting of milk cartons, ice cream containers, ice cream tops, newspaper, unprinted paper, and mixtures thereof.

51. The process as set forth in claim 48 wherein said waste material is essentially a mixture of milk cartons and unprinted strips of paper.

52. The process as set forth in claim 48 wherein said waste material consists essentially of a mixture of ice cream containers and newspaper.

53. The process as set forth in claim 48 wherein said waste material is essentially a mixture of single or two-sided glossy printer trimmings, ice cream tops and unprinted colored paper.

54. The process as set forth in claim 48 wherein said chemical aids include at least one chemical selected from the group consisting of alkaline agent, buffer, bleaching agent, detergents, surfactants, solvents, dispersants, chelating agents, sequestrants, and mixtures thereof.

55. The process as set forth in claim 54 wherein said alkaline agent is sodium hydroxide.

56. The process as set forth in claim 54 wherein said bleaching agent is hydrogen peroxide or sodium hypochlorite.

57. The process as set forth in claim 48 wherein said chemical aid is a mixture of sodium hydroxide and hydrogen peroxide.

58. The process as set forth in claim 48 wherein said chemical aids comprise sodium hydroxide.

59. The process as set forth in claim 48 wherein heat is introduced in the form of steam so as to bring about internal temperature in the range of about 100° C. to about 140° C. and pressure in the range of above 0 psig to about 35 psig.

60. The process as set forth in claim 48 wherein heat is introduced in the form of steam so as to bring about an internal temperature of at least about 110° C. and a pressure of at least about 5 psig.

61. The process as set forth in claim 60 in which the time required to accomplish pulping is about 40 to 90 minutes.

62. The process as set forth in claim 48 wherein heat is introduced in the form of steam so as to bring about an internal temperature of about 135° C. and a pressure of about 30 psig.

63. The process as set forth in claim 62 in which the time required to accomplish pulping is about 40 to 80 minutes.

64. The process as set forth in claim 48 wherein at least 65 percent of said paper is defibered.

65. The process as set forth in claim 48 wherein at least 90 percent of said paper is defibered.

66. The process as set forth in claim 48 wherein said pulp fraction contains no more than about 60 weight percent of said polymeric waste material based on the total weight of said pulp and said polymeric waste material.

67. The process as set forth in claim 48 wherein a substantial amount of color bodies from said solid wastes are trapped in said separated plastic.

68. A process for recycling paper-containing and polymer waste materials utilizing a pressure vessel of generally cylindrical configuration, having rotatably mounted in its interior, a drum of generally cylindrical configuration that is adapted to be driven about its longitudinal axis, said pressure vessel having an inlet end and a closure member therefor, said drum having an open inlet adjacent said inlet of said vessel, said interior of said drum being equipped with at least one helically configured baffle and lifting paddles adapted to agitate said paper-containing and plastic-containing waste materials, said process comprising the steps of:
- a) introducing said waste materials and water through said inlet of said vessel into the inlet of said drum;
- b) introducing suitable amounts of chemical aids in order to facilitate defibering of the paper fraction of said waste materials;
- c) closing said closure member thereby making the vessel pressure tight;
- d) driving said drum in rotation about its longitudinal axis, so as to bring about agitation of said waste material in the drum;
- e) adding thermal energy to said waste material in order to facilitate the sterilization of said waste materials in the drum, and raising said pressure inside said vessel to a level above atmospheric pressure;
- f) continuing to rotate the drum with added heat to accomplish repulping of the moisture absorptive paper fraction and separation of component fractions by density and size; and
- g) discharging said treated waste materials from said drum and said vessel, said pulped paper fraction being generally discharged first, wherein said pulped paper fraction is substantially defibered and substantially free of said polymeric and other contaminants in said waste materials, and non-pulped polymeric material is generally discharged thereafter essentially agglomerated.

69. The process as set forth in claim 68 wherein said waste material is selected from the group consisting of polymer coated board having wet strength resin, polymer coated board having no wet strength resin, glossy printer trimmings, two-sided coated board with and without wet strength resin, two-sided glossy printer trimmings, ultraviolet (UV) cured ink coated stocks, and mixtures thereof.

70. The process as set forth in claim 68 wherein one or more of said waste material is selected from the group consisting of milk carton, ice cream containers, ice cream tops, newspaper, unprinted paper, and mixtures thereof.

71. The process as set forth in claim 68 wherein said chemical aid is a mixture of sodium hydroxide and hydrogen peroxide.

72. The process as set forth in claim 68 wherein said chemical aids include sodium hydroxide.

73. The process as set forth in claim 68 in which thermal energy is added by way of steam supplied to the drum during drum rotation, which steam penetrates said waste material and facilitates in repulping of the paper fraction.

74. The process as set forth in claim 68 wherein at least 65 percent of said waste paper is defibered.

75. The process as set forth in claim 68 wherein at least 90 percent of said waste paper is defibered.

76. The process as set forth in claim 68, further comprising utilizing said pulped paper fraction to make a recycle fiber-containing paper product.

77. The process according to claim 76, wherein said recycle fiber-containing paper product is paperboard suitable for making paper plates.

78. The process as set forth in claim 76, wherein said recycle fiber-containing paper product is absorbent paper sheet.

79. The process as set forth in claim 76, wherein said recycle fiber-containing paper product is a paper tissue product.

80. The process as set forth in claim 76, wherein said recycle fiber-containing paper product is a paper towel product.

81. The process as set forth in claim 76, wherein said recycle fiber-containing paper product is a newsprint paper product.

82. The process as set forth in claim 76, wherein said recycle fiber-containing product is a cardboard product.

83. The process as set forth in claim 82, wherein said recycle fiber-containing paper product is a corrugated cardboard paper product.

84. The process as set forth in claim 76, wherein said recycle fiber-containing paper product is a writing paper product.

85. A process for processing inked paper-containing and plastic-containing waste materials utilizing a pressure vessel of generally cylindrical configuration, having rotatably mounted in its interior, a drum of generally cylindrical configuration that is mounted to be driven about its longitudinal axis, said pressure vessel having an inlet end and a closure member therefor, said drum having an open inlet adjacent said inlet of said vessel, said interior of said drum being equipped with at least one helically configured baffle and lifting paddles adapted to agitate said paper-containing and plastic-containing waste materials, such process comprising the steps of:
 a) introducing said waste material and water through said inlet of said vessel into the inlet of said drum;
 b) introducing suitable amounts of a chemical aid in order to facilitate defibering of the paper fraction of said waste material, wherein said chemical aid is selected from the group consisting of sodium hydroxide, sodium hypochlorite, hydrogen peroxide, and mixtures thereof;
 c) closing said closure member thereby making the vessel pressure tight;
 d) driving said drum in rotation about its longitudinal axis, so as to bring about agitation of said waste material in the drum;
 e) injecting steam to provide heat and to raise the pressure inside said vessel to a level above atmospheric pressure in order to accomplish repulping of the moisture absorptive paper fractions, such that the separation of component fractions by density and by size can thereafter be accomplished;
 f) continuing to rotate the drum in the presence of the added steam for a sufficient length of time to accomplish substantial repulping of the moisture absorptive paper fraction; and thereafter
 g) discharging said treated waste materials from said drum and said vessel, wherein said pulped paper fraction is substantially defibered and substantially de-inked and free of said polymeric contaminants in said waste materials, and non-pulped polymeric material is generally agglomerated, and wherein said ink is concentrated within said non-pulped polymeric material.

86. The process as set forth in claim 85 which further includes a processing step utilizing said pulp for the production of a recycle fiber-containing paper product.

87. The process as set forth in claim 85, wherein said recycle fiber-containing paper product is paperboard suitable for making paper plates.

88. The process as set forth in claim 85, wherein said recycle fiber-containing paper product is an absorbent paper sheet.

89. The process as set forth in claim 85, wherein said recycle fiber-containing paper product is a paper tissue product.

90. The process as set forth in claim 85, wherein said recycle fiber-containing paper product is a paper towel product.

91. The process as set forth in claim 85, wherein said recycle fiber-containing paper product is a newsprint paper product.

92. The process as set forth in claim 85, wherein said recycle fiber-containing product is a cardboard product.

93. The process as set forth in claim 92, wherein said recycle fiber-containing paper product is a corrugated cardboard paper product.

94. The process as set forth in claim 85, wherein said recycle fiber-containing paper product is a writing paper product.

95. A process for preparing recycled paper product from paper-containing and polymeric residue containing waste materials utilizing a pressure vessel of generally cylindrical configuration, having rotatably mounted in its interior, a drum of generally cylindrical configuration that is adapted and configured to be driven about its longitudinal axis, said pressure vessel having an inlet end and a closure member therefor, said drum having an open inlet adjacent said inlet of said vessel, said interior of said drum being equipped with at least one helically configured baffle and lifting paddles adapted to agitate said paper-containing and plastic-containing waste materials, such process comprising the steps of:
 a) introducing said waste materials and water through said inlet of said vessel, into the inlet of said drum;
 b) introducing suitable amounts of one or more chemical aids in order to facilitate defibering of the paper fraction of said waste material, wherein said chemical aid is selected from the group consisting of sodium hydroxide, sodium hypochlorite, hydrogen peroxide, and mixtures thereof;
 c) closing said closure member thereby making the vessel pressure tight;

d) driving said drum in rotation about its longitudinal axis, so as to agitate said waste material in the drum;

e) injecting steam to provide heat and to raise the pressure inside said vessel to a level above atmospheric pressure in order to accomplish repulping of the moisture absorptive paper fractions, such that the separation of component fractions by density and by size can thereafter be accomplished;

f) continuing to rotate the drum in the presence of the added steam for a sufficient length of time in order to complete repulping of the moisture absorptive paper fraction;

g) opening said closure member and discharging said treated waste materials from said drum and said vessel wherein said pulped paper fraction is substantially defibered and substantially free of said polymeric contaminants in said waste materials, and non-pulped polymeric material is generally agglomerated; and h) subjecting said discharged paper pulp fraction to further processing in the production of a recycled paper product.

96. The process as set forth in claim 95, wherein said recycle fiber-containing paper product is paperboard suitable for making paper plates.

97. The process as set forth in claim 95, wherein said recycle fiber-containing paper product is an absorbent paper sheet.

98. The process as set forth in claim 95, wherein said recycle fiber-containing paper product is a paper tissue product.

99. The process as set forth in claim 95, wherein said recycle fiber-containing paper product is a paper towel product.

100. The process as set forth in claim 95, wherein said recycle fiber-containing paper product is a newsprint paper product.

101. The process as set forth in claim 95, wherein said recycle fiber-containing product is a cardboard product.

102. The process as set forth in claim 101, wherein said recycle fiber-containing paper product is a corrugated cardboard paper product.

103. The process as set forth in claim 95, wherein said recycle fiber-containing paper product is a writing paper product.

104. A process for recycling waste paper stock provided with a polymeric coating comprising:

a) introducing said coated waste paper stock into the interior of a rotatable inclined drum provided with a plurality of mixing paddles affixed to the interior surface of said drum together with water and an alkaline agent;

b) rotating the drum while maintaining the drum interior at elevated temperature and pressure wherein said mixing paddles are operative to mechanically reflux the waste material with respect to the inclination of said drum and the polymeric material is thereby agglomerated in a polymeric phase and contaminants are concentrated therein, whereas the paper fraction of said paper stock is defibered to form a recycle pulp phase;

c) continuing to rotate the drum and adding heat to accomplish substantially complete repulping of the waste paper fiber and separation of component fractions by density and size;

d) discharging the waste material from the drum; and e) separating the recycle pulp phase from the polymeric phase.

105. The process as set forth in claim 104, said drum is rotated at a speed of at least about 8 revolutions per minute.

106. The process as set forth in claim 105, wherein said drum is rotated at a speed of at least about 10 revolutions per minute.

107. The process as set forth in claim 104, wherein the consistency of the waste and water mixture introduced into the drum is at least about 10 percent.

108. The process as set forth in claim 107, wherein the consistency of the waste and water mixture introduced into the drum is at least about 20 percent.

109. The process as set forth in claim 104, wherein said drum is further provided with a helical baffle about its interior.

110. The process as set forth in claim 104, wherein the temperature in the interior of said drum is maintained at a temperature of at least about 110° C. while rotating said drum.

111. The process as set forth in claim 104, wherein said alkaline agent is sodium hydroxide.

112. The process as set forth in claim 111, wherein sodium hydroxide is present in water solution at a concentration of at least about 1% based on the weight of water and sodium hydroxide introduced into said inclined drum.

113. The process as set forth in claim 111, wherein sodium hydroxide is present in water solution at a concentration of at least about 2% based on the weight of water and sodium hydroxide introduced into said inclined drum.

114. The process as set forth in claim 113, wherein sodium hydroxide is present in water solution at a concentration of at least about 3% based on the weight of water and sodium hydroxide introduced into said inclined drum.

115. The process as set forth in claim 114, wherein said coated waste paper stock comprises a mixture of UV cured coated waste paper stock and waste paper stock provided with a polymer other than a UV cured polymer.

* * * * *

UNITED STATES PATENT AND TRADEMARK OFFICE
CERTIFICATE OF CORRECTION

PATENT NO.     : 6,458,240 B1
DATED          : October 1, 2002
INVENTOR(S)    : Michael P. Bouchette et al.

It is certified that error appears in the above-identified patent and that said Letters Patent is hereby corrected as shown below:

Column 3,
Line 41, change "through" to -- though --;

Column 4,
Line 16, change "deliberation" to -- defiberation --;

Column 5,
Line 31, delete "is";

Column 6,
Line 23, change "tends" to -- tend --;
Line 28, change "UP" to -- up --;

Column 8,
Line 49, insert -- the -- between "into" and "vessel";

Column 12,
Line 10, delete "any" after "scale" and insert -- any -- after "handle";

Column 13,
Line 22, insert -- those -- after "include";

Column 17,
Line 11, delete "step" and insert -- steps --;
Line 18, delete "basics" and insert -- basic --;

Column 19,
Line 58, insert -- the -- after "under";

UNITED STATES PATENT AND TRADEMARK OFFICE
CERTIFICATE OF CORRECTION

PATENT NO.     : 6,458,240 B1
DATED          : October 1, 2002
INVENTOR(S)    : Michael P. Bouchette et al.

It is certified that error appears in the above-identified patent and that said Letters Patent is hereby corrected as shown below:

<u>Column 20,</u>
Line 60, delete "was" after "plastic";

Signed and Sealed this

Twenty-sixth Day of August, 2003

JAMES E. ROGAN
*Director of the United States Patent and Trademark Office*